(12) United States Patent
Nakashiba et al.

(10) Patent No.: US 10,578,805 B2
(45) Date of Patent: Mar. 3, 2020

(54) SEMICONDUCTOR DEVICE AND MANUFACTURING METHOD THEREOF

(71) Applicant: RENESAS ELECTRONICS CORPORATION, Tokyo (JP)

(72) Inventors: Yasutaka Nakashiba, Ibaraki (JP); Shinichi Watanuki, Ibaraki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/183,433

(22) Filed: Nov. 7, 2018

(65) Prior Publication Data

US 2019/0196110 A1 Jun. 27, 2019

(30) Foreign Application Priority Data

Dec. 27, 2017 (JP) .................................. 2017-250943

(51) Int. Cl.
*G02B 6/30* (2006.01)
*G02B 6/122* (2006.01)
*G02B 6/13* (2006.01)
*G02B 6/12* (2006.01)

(52) U.S. Cl.
CPC ........... *G02B 6/305* (2013.01); *G02B 6/1225* (2013.01); *G02B 6/1228* (2013.01); *G02B 6/13* (2013.01); *G02B 2006/12166* (2013.01)

(58) Field of Classification Search
CPC .............................. G02B 6/305; G02B 6/1228
See application file for complete search history.

(56) References Cited

U.S. PATENT DOCUMENTS

| 7,076,135 | B2 | 7/2006 | Yamada et al. | |
| 7,116,878 | B2 * | 10/2006 | Zoorob | B82Y 20/00 385/129 |
| 7,831,124 | B2 * | 11/2010 | Kiyota | B82Y 20/00 257/79 |
| 9,547,129 | B1 * | 1/2017 | Kato | G02B 6/26 |
| 10,168,476 | B2 * | 1/2019 | Doerr | G02B 6/34 |
| 2003/0185532 | A1 * | 10/2003 | Hosomi | B82Y 20/00 385/129 |
| 2008/0095494 | A1 * | 4/2008 | Luryi | B82Y 20/00 385/28 |
| 2010/0150494 | A1 * | 6/2010 | Prosyk | G02B 6/1228 385/2 |
| 2010/0226609 | A1 * | 9/2010 | Tokushima | B82Y 20/00 385/50 |
| 2012/0092973 | A1 * | 4/2012 | Imada | G11B 5/314 369/13.32 |
| 2016/0041340 | A1 * | 2/2016 | Shi | G02B 6/305 385/14 |
| 2018/0120504 | A1 * | 5/2018 | Qi | G02B 6/124 |
| 2019/0094467 | A1 * | 3/2019 | Hassan | G02B 6/136 |

FOREIGN PATENT DOCUMENTS

JP 2004-133446 A 4/2004

* cited by examiner

*Primary Examiner* — Sung H Pak
(74) *Attorney, Agent, or Firm* — McDermott Will & Emery LLP

(57) ABSTRACT

An optical waveguide formed at the same layer as that of a microscopic optical device and a spot size converter largely different in size are integrally formed. A semiconductor device has an optical waveguide part functioning as a spot size converter. The optical waveguide part includes a plurality of optical waveguide bodies penetrating through an interlayer insulation layer in the thickness direction.

19 Claims, 25 Drawing Sheets

SEMICONDUCTOR DEVICE AND MANUFACTURING METHOD THEREOF

CROSS-REFERENCE TO RELATED APPLICATIONS

The disclosure of Japanese Patent Application No. 2017-250943 filed on Dec. 27, 2017 including the specification, drawings and abstract is incorporated herein by reference in its entirety.

BACKGROUND

The present invention relates to a semiconductor device, and a manufacturing technology thereof. It relates to, for example, a technology effectively applicable to a semiconductor device including an optical waveguide, and a manufacturing technology thereof.

Japanese Unexamined Patent Application Publication No. 2004-133446 (Patent Document 1) describes a technology regarding, for example, a spot size converter capable of reducing the coupling loss with an optical fiber.

CITED DOCUMENT

Patent Document

[Patent Document 1] Japanese Unexamined Patent Application Publication No. 2004-133446

SUMMARY

For example, when an emitted light from an external second optical waveguide is directly made incident upon a first optical waveguide formed at the same layer as that of an optical modulator or the like, the difference between the spot size of the light propagating through the first optical waveguide and the spot size of the light propagating through the second optical waveguide may cause a light loss. Thus, in order to introduce a light between the first optical waveguide and the second optical waveguide at a low loss, there is a technology of providing a spot size converter for converting the spot size of a light between the first optical waveguide and the second optical waveguide. Herein, for example, a study has been conducted on the integral formation of the first optical waveguide and the spot size converter.

In this regard, a study by the present inventors has revealed that, for example, when the first optical waveguide formed at the same layer as that of an optical modulator, or the like, and a spot size converter are integrally formed, room for novel improvement due to a large difference between the size of the optical modulator or the like, and the size of the spot size converter becomes obvious.

Other problems and novel features will be apparent from the description of the present specification and the accompanying drawings.

A semiconductor device in one embodiment has an optical waveguide part functioning as a spot size converter. The optical waveguide part includes a plurality of optical waveguide bodies penetrating through an interlayer insulation layer in the thickness direction.

In accordance with one embodiment, the reliability of a semiconductor device having a spot size converter can be enhanced.

DETAILED DESCRIPTION

Figure 1:
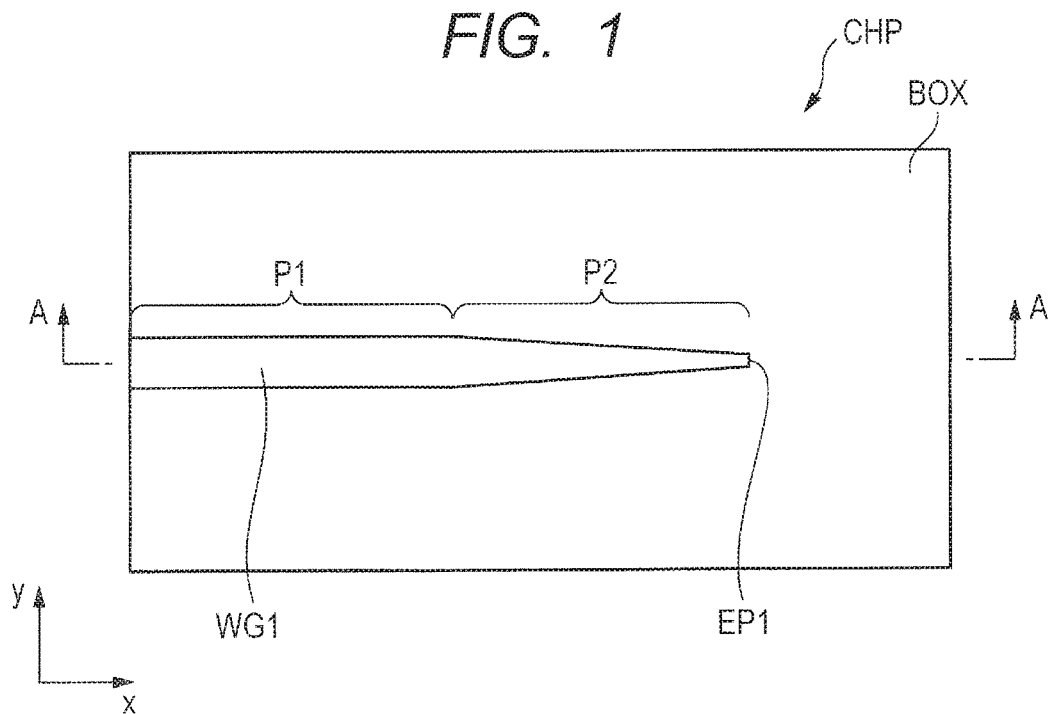
FIG. 1 is a plan view showing a schematic partial configuration of a semiconductor chip including a spot size converter in the related art.

In description of the following embodiment, the embodiment may be described in a plurality of divided sections or embodiments for convenience, if required. However, unless otherwise specified, these are not independent of each other, but are in a relation such that one is a modified example, details, a complementary explanation, or the like of a part or the whole of the other.

Further, in the following embodiments, when a reference is made to the number of elements, and the like (including number, numerical value, quantity, range, or the like), the number of elements, or the like is not limited to the specific number, but may be greater than or less than the specific number, unless otherwise specified, except for the case where the number is apparently limited to the specific number in principle, or except for other cases.

Further, in the following embodiments, it is needless to say that the constitutional elements (including element steps, or the like) are not always essential, unless otherwise specified, and except for the case where they are apparently considered essential in principle, or except for other cases.

Similarly, in the following embodiments, when a reference is made to the shapes, positional relationships, or the like of the constitutional elements, or the like, it is understood that they include ones substantially analogous or similar to the shapes or the like, unless otherwise specified, and unless otherwise considered apparently in principle, or except for other cases. This also applies to the foregoing numerical values and ranges.

Further, in all the drawings for describing the embodiments, the same members are given the same reference signs and numerals in principle, and a repeated description thereon is omitted.

Incidentally, hatching may be added even in a plan view for ease of understanding of the drawing.

First Embodiment

Spot Size Converter

In recent years, aiming at the miniaturization of an optical integrated circuit, research and development regarding an optical waveguide such as a silicon waveguide or a photonic crystal waveguide using a SOI (Silicon On Insulator) substrate has been conducted. Such an optical waveguide is optically coupled with an optical device such as a light emitting element or a light receiving element. Herein, what matters in coupling between the optical waveguide and a light emitting element is the large difference between the spot size of the light propagating through the optical waveguide and the spot size at the light emitting element represented by a semiconductor laser. For example, when an optical waveguide and a light emitting element having mutually different spot sizes are coupled with each other as they are, the light loss at the coupling portion unfavorably increases. Similarly, also in coupling between an optical waveguide and an optical fiber, the light loss at the coupling portion between the optical waveguide and the optical fiber due to a large difference between the spot size of the light propagating through the optical waveguide and the spot size of the light propagating through the optical fiber becomes obvious as a problem. For example, the spot size of the light propagating through the optical waveguide becomes of a submicron order. On the other hand, the spot size of the light at an optical fiber or a light emitting element becomes of a several-micron order. Therefore, it is difficult to directly couple an optical waveguide for propagating a light with a relatively smaller spot size therethrough, and an optical fiber for propagating a light with a relatively larger spot size therethrough, or a light emitting element with a large spot size with a high efficiency. This results in insertion of a spot size converter for converting the spot size of a light between the optical waveguide for propagating a light with a relatively smaller spot size therethrough, and an optical fiber for propagating a light with a relatively larger spot size therethrough, or a light emitting element with a large spot size. In this regard, a study has been conducted on the integral formation of the optical waveguide formed at the same layer as that of an optical modulator or the like, and the spot size converter. However, a study by the present inventors has revealed as follows: for example, when the first optical waveguide formed at the same layer as that of the optical modulator or the like, and the spot size converter are integrally formed, room for novel improvement due to a large difference between the size of the microscopic optical modulator or the like, and the size of the spot size converter becomes obvious. Under such circumstances, below, first, using the related art, the room for novel improvement found by the present inventors will be described. Then, the technical idea in the present First Embodiment in which elaborate measures are taken for the room for novel improvement will be described.

Room for Improvement Present in the Related Art

First, the room for improvement present in the related art will be described. The term "related art" referred to in the present specification is the technology having the problem newly found by the inventors, and is not the known related art, but the technology described intended for the precursor technology of the novel technical idea (unknown technology)

Figure 2:
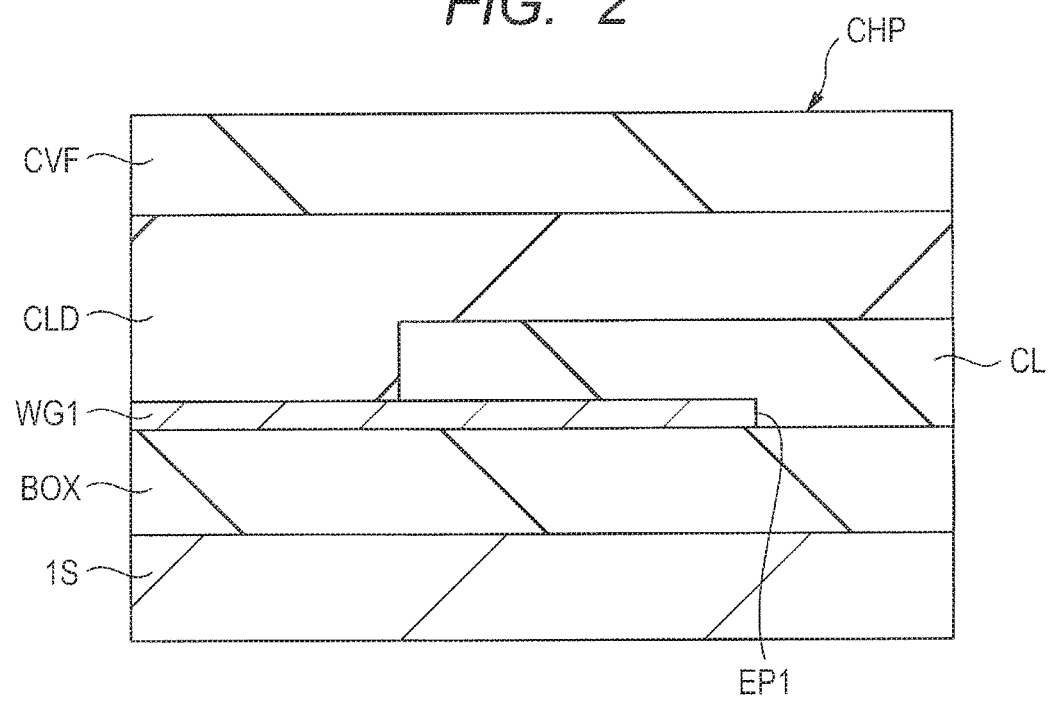
FIG. 2 is a cross sectional view cut along line A-A of FIG. 1.

FIG. 1 is a plan view showing a schematic partial configuration of a semiconductor chip CHP including a spot size converter in the related art. As shown in FIG. 1, for example, a buried insulation layer BOX formed of a silicon oxide layer is formed in the semiconductor chip CHP. Over the buried insulation layer BOX, an optical waveguide WG1 extending in the x direction is formed. The optical waveguide WG1 is formed of, for example, silicon or germanium. At this step, as shown in FIG. 1, the width of the optical waveguide WG1 (the length of the optical waveguide WG1 in the direction orthogonal to the propagation direction of the light, and along the main surface of the insulation layer BOX, the same hereinafter) includes a portion P1 formed of a substantially same line shape, and a portion P2 formed of a taper shape narrowing in width with approach toward one end EP1 of the optical waveguide WG1. Then, the portion P2 formed of the taper shape forms a part of the optical waveguide WG1, and forms a part of the spot size converter FIG. 2 is a cross sectional view cut along line A-A of FIG. 1. As shown in FIG. 2, for example, over a substrate layer 1S formed of silicon, the buried insulation layer BOX formed of a silicon oxide layer is formed. Over the buried insulation layer BOX, the optical waveguide WG1 formed of, for example, silicon is formed. Then, as shown in FIG. 2, a core layer CL is formed from over a part of the optical waveguide WG1 including one end EP1 of the optical waveguide WG1 to over the buried insulation layer BOX. Further, a cladding layer CLD is formed over the insulation layer BOX in such a manner as to cover the core layer CL and the optical waveguide WG1 exposed from the core layer CL. Over the cladding layer CLD, a cover film CVF is formed. The cover film CVF is, for example, a silicon oxide film with a thickness of about 1.5 µm.

The optical waveguide WG1 is formed at the same layer as that of an optical device not shown (such as a photodetector or an optical modulator) formed in other regions of the semiconductor chip CHP. That is, the optical waveguide WG1 and the optical device are covered with the same interlayer insulation layer over the same insulation film BOX. On the other hand, the core layer CL is formed in a manner capable of being optically coupled with, for example, a semiconductor laser arranged in the semiconductor chip CHP, or an optical fiber provided outside the semiconductor chip CHP. At this step, the optical waveguide WG1 is interposed between the buried insulation layer BOX and the cladding layer CLD having a lower refractive index than the refractive index of the optical waveguide WG1. For this reason, a light is confined inside the optical waveguide WG1. In other words, a light propagates inside the optical waveguide WG1. On the other hand, the core layer CL is also interposed between the buried insulation layer BOX and the cladding layer CLD having a lower refractive index than the refractive index of the core layer CL. For this reason, a light is confined inside the core layer CL. In other words, a light propagates inside the core layer CL.

Herein, a part of the optical waveguide WG1, the core layer CL, the buried insulation layer BOX, and the cladding layer CLD shown in FIG. 2 become main constituent elements of the spot size converter. For example, when a light having a wavelength of 1.55-μm band most often used for optical communication is adopted, the height of the cross section of the optical waveguide WG1 formed at the same layer as that of a microscopic optical device formed at the semiconductor chip CHP is about 0.2 μm, and the width of the cross section is about 0.4 μm. The height and width of the cross section of the core layer CL optically coupled with the semiconductor laser or the optical fiber are both, for example, about 3 μm.

In the spot size converter thus configured, a light propagates through the optical waveguide WG1 and the core layer CL. For example, when the semiconductor laser is arranged in such a manner as to face to the core layer CL, a laser light emitted from the semiconductor laser reaches the end face (light receiving surface) of the core layer CL. Then, for the laser light propagating through the core layer CL from the light receiving surface of the core layer CL toward the optical waveguide WG1, the distribution of the laser light moves from the core layer CL to the optical waveguide WG1 via the portion P2 of the taper portion of the optical waveguide WG1 adjacent to the core layer CL as the laser light propagates inside the core layer CL. For example, the movement of the distribution of the laser light depends upon the shape of the portion P2 of the taper portion.

In the manner described up to this point, for example, when a light propagates from the optical waveguide WG1 to the core layer CL, the spot size is gradually increased by the spot size converter. Therefore, by coupling the optical waveguide WG1 and the optical waveguide WG2 via the spot size converter, it is possible to suppress the light loss between the optical waveguide WG1 and the optical waveguide WG2 having mutually different cross sectional sizes.

However, when the optical waveguide formed at the same layer as that of the microscopic optical device and the spot size converter are integrally formed, it becomes difficult to form a good spot size converter for suppressing the light loss due to a large difference between the size of the optical device and the size of the spot size converter. That is, the integral formation of the optical waveguide formed at the same layer as that of the optical device and the spot size converter requires elaborate measures. Below, this point will be described.

First, as the method for forming the core layer CL from a silicon nitride film, for example, the following method can be considered: after forming a silicon oxide film with a thickness of a several-micron order, an opening with a large size corresponding to the core layer CL is formed in the silicon oxide film; a silicon nitride film is buried in the inside of the opening, thereby to form the core layer CL. However, with this method, a silicon nitride film is required to be buried in the inside of the opening with a large size of a several-micron order. At this step, with a film deposition method by a semiconductor manufacturing technology represented by a CVD method, it is difficult to form a silicon nitride film in such a manner as to fill a large opening of a several-micron order.

The description up to this point indicates that the formation of the optical waveguide WG1 having a size of a submicron order, and the spot size converter including the core layer CL of a several-micron order by a semiconductor manufacturing technology requires elaborate measures. Under such circumstances, in the present First Embodiment, elaborate measures are taken for integrally forming the optical waveguide WG1 having a size of a submicron order, and the spot size converter including the core layer CL of a several-micron order by a semiconductor manufacturing technology. Below, the technical idea in the present First Embodiment in which the elaborate measures are taken will be described by reference to the accompanying drawings.

Configuration of Semiconductor Device

Figure 3:
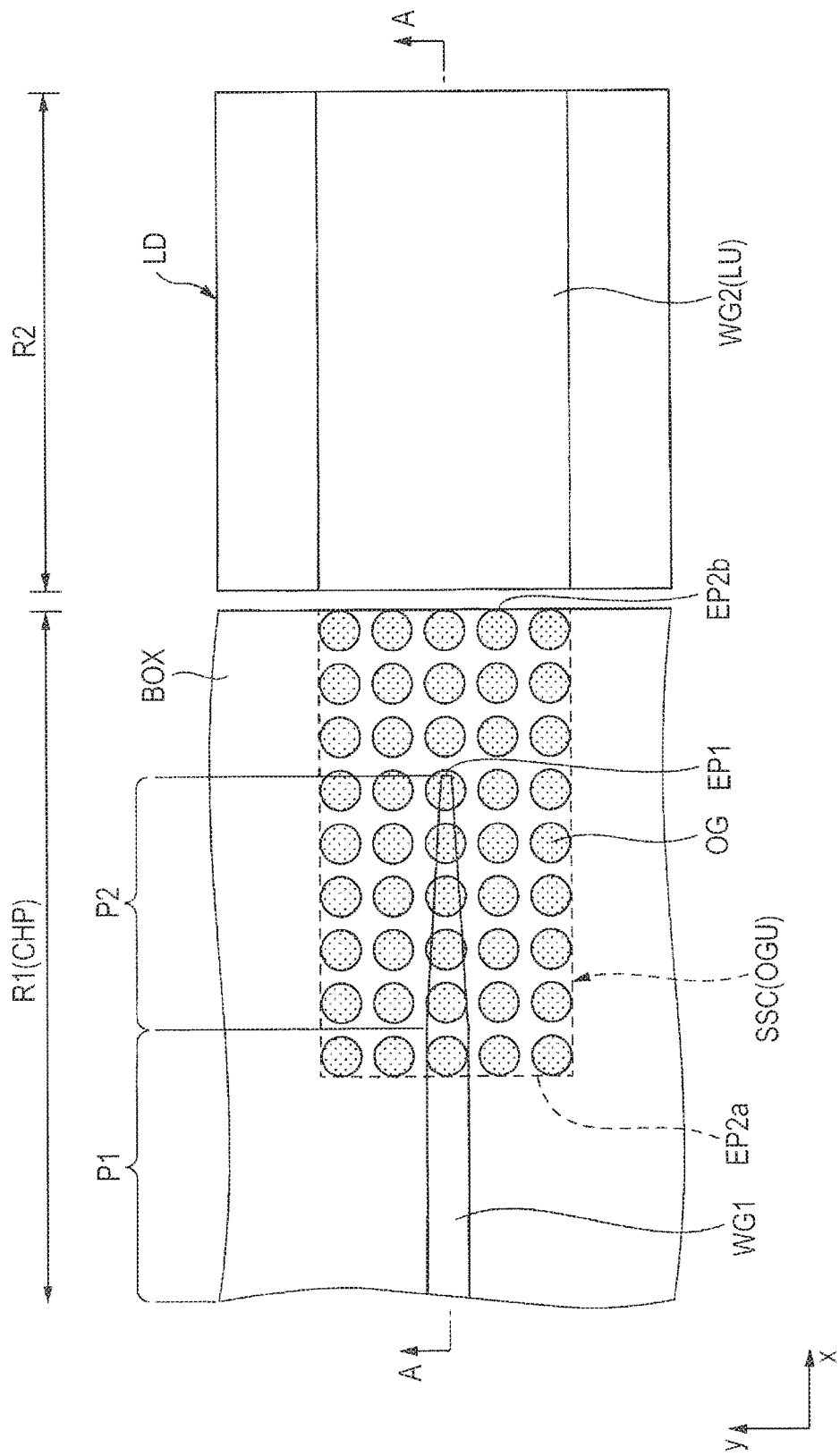
FIG. 3 is a plan view showing a schematic configuration of a semiconductor device including a spot size converter in First Embodiment.

FIG. 3 is a plan view showing a schematic configuration of the semiconductor device including a spot size converter in the present First Embodiment. In FIG. 3, the semiconductor chip CHP in the present First Embodiment has a region R1 and a region R2 arranged side by side in the x direction. Then, in the region R1, an optical waveguide WG1 extending in the x direction, and a spot size converter SSC optically coupled with the optical waveguide WG1 are formed. The optical waveguide WG1 is formed at the same layer as that of an optical device not shown in FIG. 3. On the other hand, in the region R2, a semiconductor laser (laser light source) LD of a light emitting element is arranged. The region R2 may be either a concave part formed over the substrate of the semiconductor chip CHP, or a region outside the semiconductor chip CHP. That is, the semiconductor laser LD either may be arranged in the concave part formed over the substrate of the semiconductor chip CHP, or may be arranged in such a manner as to adjacent to the substrate of the semiconductor chip CHP in a plan view.

Incidentally, FIG. 3 shows an example in which the semiconductor laser LD is arranged in such a manner as to be adjacent to the substrate of the semiconductor chip CHP in a plan view.

The semiconductor laser LD has a light emitting part LU for producing a laser light. Herein, in the present specification, the light emitting part LU itself of the semiconductor laser LD also propagates the laser light produced in the inside thereof, and hence is regarded as the optical waveguide WG2.

Incidentally, the present First Embodiment describes an example in which the optical waveguide WG1 and the spot size converter SSC are arranged in the region R1 of the semiconductor chip CHP, and, the semiconductor laser LD including the optical waveguide WG2 is arranged in the region R2 outside the semiconductor chip CHP as shown in FIG. 3. However, the technical idea in the present First Embodiment is not limited to this configuration, but is also applicable to, for example, a configuration in which the optical waveguide WG1 and the spot size converter SSC are arranged at the semiconductor chip CHP, and the optical fiber including the optical waveguide WG2 optically coupled with the spot size converter SSC is arranged outside the semiconductor chip CHP. Further, the technical idea is also applicable to a configuration in which the optical waveguide WG1, the spot size converter SSC, and the optical waveguide WG2 (semiconductor laser LD) are arranged at one semiconductor chip CHP.

Then, as shown in FIG. 3, the optical waveguide WG1 has a portion P1 having substantially the same width, and a portion P2 formed of a taper shape narrowing in width with approach toward one end EP1 of the optical waveguide WG1. Then, the spot size converter SSC to be optically coupled with the optical waveguide WG1 includes the portion P2 of the optical waveguide WG1, and a plurality of optical waveguide bodies OG. In other words, the portion P2 of the optical waveguide WG1 not only functions as a portion of the optical waveguide WG1, but also functions as the constituent element of the spot size converter SSC. Further, the plurality of optical waveguide bodies OG of the constituent elements of the spot size converter SSC are arranged at a prescribed pitch (first pitch) in the x direction (first direction) of extension of the optical waveguide WG1, and are also arranged at a prescribed pitch (first pitch) in the y direction (second direction) orthogonal to the x direction and along the main surface of the substrate.

However, for the plurality of optical waveguide bodies OG of the constituent elements of the spot size converter SSC, the pitch of arrangement in the x direction may be different from the pitch of arrangement in the y direction.

Further, the plurality of optical waveguide bodies OG of the constituent elements of the spot size converter SSC include the optical waveguide bodies OG overlapping the portion P2 of the optical waveguide WG1 in a plan view, and the optical waveguide bodies OG not overlapping the portion P2 of the optical waveguide WG1 in a plan view.

Any number of the optical waveguide bodies OG is acceptable so long as the number allows an optical coupling between the optical waveguide WG1 and the optical waveguide WG2. The number may be appropriately determined according to the width and the height of the optical waveguide body OG, and the like.

Incidentally, one end (right end) EP1 of the portion P2 of the optical waveguide WG1 is situated between one end (left end) EP2a of the spot size converter SSC (optical waveguide part) and the other end (right end) EP2b of the spot size converter SSC (optical waveguide part).

Figure 4:
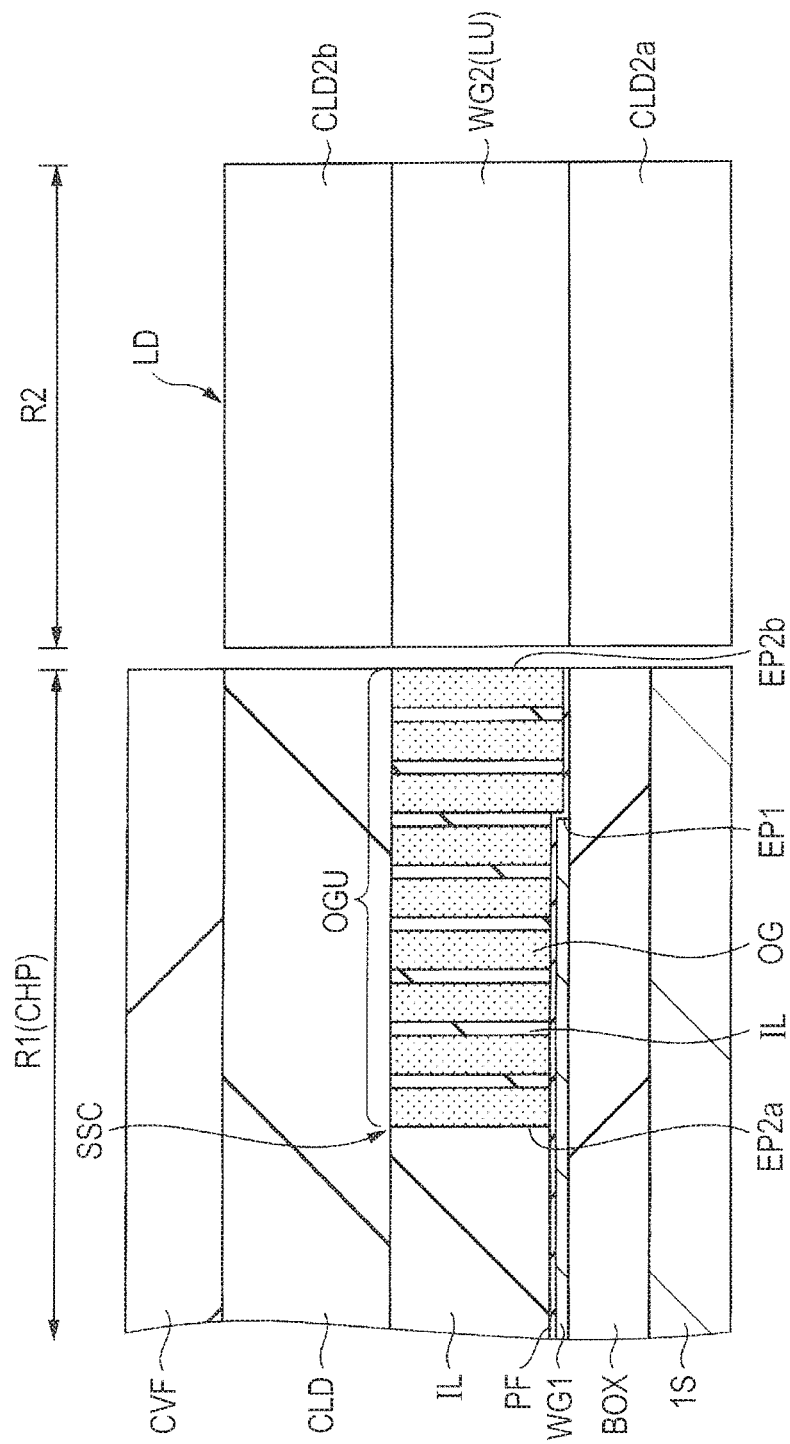
FIG. 4 is a cross sectional view of the semiconductor device along line A-A of FIG. 3.

Subsequently, FIG. 4 is a cross sectional view cut along line A-A of FIG. 3. As shown in FIG. 4, in the region R1 of the semiconductor chip CHP, a substrate layer (silicon substrate) 1S having an insulation layer BOX formed of, for example, a silicon oxide film is arranged. Over the insulation layer BOX, the optical waveguide WG1 formed of, for example, silicon or germanium is formed. Then, a protective film PF formed of, for example, a silicon oxide film is formed in such a manner as to cover the optical waveguide WG1. Further, as shown in FIG. 4, an interlayer insulation layer IL covering the optical waveguide WG1 is formed via the protective film PF. In the interlayer insulation layer IL, an optical waveguide part OGU capable of transmitting a light in the inside thereof is formed. The width of the optical waveguide part OGU is larger than the width of the optical waveguide WG1. In addition, the height of the optical waveguide part OGU is larger than the height of the optical waveguide WG1.

Herein, the optical waveguide part OGU means the region surrounded by four virtual planes (see a broken line of FIG. 3) circumscribed on a plurality of optical waveguide bodies OG formed on the outermost side of the optical waveguide part OGU, the virtual plane in contact with the ceiling surfaces of the plurality of optical waveguide bodies OG, and the virtual plane in contact with the bottom surfaces of the plurality of optical waveguide bodies OG. Further, the width of the optical waveguide part OGU represents the length of the optical waveguide part OGU orthogonal to the direction of extension of the optical waveguide part OGU, and along the main surface of the insulation layer BOX.

Then, the one end (left end) EP2a of the optical waveguide part OGU is arranged over the portion P1 (protective film PF) of the optical waveguide WG1. That is, the optical waveguide part OGU is arranged in such a manner as to cover the portion P2 of the optical waveguide part WG1. The other end (right end) EP2b of the optical waveguide part OGU is formed in such a manner as to be able to receive a light from the optical waveguide WG2. In other words, the other end (right end) EP2b of the optical waveguide part OGU is formed in such a manner as to be able to face to the optical waveguide WG2. In still other words, it can also be said that the other end (right end) EP2b of the optical waveguide part OGU forms the light receiving surface for receiving the light from the optical waveguide WG2. In this manner, the optical waveguide part OGU is optically coupled with the optical waveguide WG1, and is also optically coupled with the optical waveguide WG2. The light receiving surface of the optical waveguide part OGU is arranged in such a manner as to face to the emitting surface of the optical waveguide WG2. The size of the light receiving surface of the optical waveguide part OGU is determined according to the size of the emitting surface of the optical waveguide WG2, and, for example, is larger than the size of the emitting surface of the optical waveguide WG2.

Then, as shown in FIG. 4, the optical waveguide part OGU has a plurality of optical waveguide bodies OG penetrating through the interlayer insulation layer IL in the thickness direction. At this step, the plurality of optical waveguide bodies OG include the optical waveguide bodies OG reaching the portion P2 of the optical waveguide WG1, and the optical waveguide bodies OG reaching the insulation layer BOX. In the present First Embodiment, each stereoscopic shape of the plurality of optical waveguide bodies OG is formed of a columnar shape. Then, the arrangement interval of the plurality of optical waveguide bodies OG is smaller than the seeping distance of the evanescent light. That is, the interval between mutually adjacent two optical waveguide bodies OG of the plurality of optical waveguide bodies OG is smaller than the seeping distance from the optical waveguide body OG to the interlayer insulation layer IL for the light propagating through the optical waveguide part OGU. The interval is, for example, about 0.1 μm.

Further, the height of the optical waveguide body OG is determined according to the size of the emitting surface of the optical waveguide WG2, and is, for example, 3.0 μm. The size of the cross section perpendicular to the height direction of the optical waveguide body OG has no particular restriction. For example, the diameter at the cross section perpendicular to the height direction of the optical waveguide body OG is about 0.3 μm.

On the other hand, as shown in FIG. 4, a semiconductor laser LD is formed in the region R2 outside the semiconductor chip CHP. Specifically, for the semiconductor laser LD formed in the region R2 outside the semiconductor chip CHP, a light emitting part (active layer) LU for confining and emitting a laser light is interposed between the cladding layer CLD2a and the cladding layer CLD2b having a smaller refractive index than that of the light emitting part LU. At the semiconductor laser LD thus configured, the light emitting part LU itself can be regarded as the optical waveguide WG2 in a broad sense through which a light propagates.

In the manner described up to this point, the semiconductor device (semiconductor chip CHP) in the present First Embodiment has at least the optical waveguide WG1 of the optical waveguide (silicon waveguide) WG1 and the optical waveguide (e.g., the light emitting part LU of the semiconductor laser or the optical fiber) WG2 having mutually different widths and heights, and, makes a light incident from the optical waveguide WG2 upon the optical waveguide WG1.

Propagation of Light in Semiconductor Device

The semiconductor device in the present First Embodiment is configured as described above. Below, the propagation of a light at the semiconductor device in the present First Embodiment will be described by reference to FIGS. 3 and 4. First, as shown in FIGS. 3 and 4, a laser light resonates at the light emitting part LU of the semiconductor laser LD arranged in the region R2 outside the semiconductor chip CHP. Then, the laser light emitted from the light emitting part LU functioning as the optical waveguide WG2 is made incident from the right end (the other end EP2b) of the optical waveguide part OGU functioning as the light receiving surface of the laser light upon the inside of the optical waveguide part OGU of the spot size converter SSC arranged in the region R1 of the semiconductor chip CHP. At this step, the optical waveguide part OGU has, as shown in FIG. 4, a plurality of optical waveguide bodies OG formed of a silicon nitride film having a higher refractive index than those of the cladding layer CLD and the insulation layer BOX formed of, for example, a silicon oxide film. For this reason, first, the laser light incident upon the inside of the optical waveguide part OGU propagates first inside the optical waveguide body OG arranged on the side closest to the light receiving surface of the optical waveguide part OGU. At this step, the interlayer insulation layer IL having a relatively smaller refractive index is interposed between the optical waveguide body OG arranged on the side closest to the light receiving surface, and the optical waveguide body OG arranged adjacent to this optical waveguide body OG. Accordingly, it is considered that the laser light does not propagate from the optical waveguide body OG arranged on the rightmost side upon the optical waveguide body OG arranged adjacent to this optical waveguide body OG on the left side. However, in the present First Embodiment, the interval between the optical waveguide body OG arranged on the side closest to the light receiving surface, and the optical waveguide body OG arranged adjacent to this optical waveguide body OG is smaller than the seeping distance of the evanescent light. For this reason, the evanescent light causes the laser light to propagate from the optical waveguide body OG arranged on the side closest to the light receiving surface upon the optical waveguide body OG arranged adjacent to this optical waveguide body OG on the left side. Thereafter, the same mechanism due to the evanescent light causes the laser light to propagate inside the optical waveguide part OGU including the plurality of optical waveguide bodies OG formed therein.

Herein, as the laser light propagating inside the optical waveguide part OGU from the light receiving surface of the optical waveguide part OGU toward the optical waveguide WG1 propagates inside the optical waveguide part OGU, the distribution of the laser light moves from the optical waveguide part OGU to the optical waveguide WG1 via the portion P2 of the taper portion of the optical waveguide WG1 adjacent to the optical waveguide part OGU. As a result, for example, when the laser light propagates from the optical waveguide part OGU to the optical waveguide WG1, the spot size is gradually reduced by the spot size converter SSC. Therefore, in accordance with the semiconductor device in the present First Embodiment, by mutually optically coupling the optical waveguide WG1 and the optical waveguide WG2 via the spot size converter SSC, it is possible to suppress the light loss between the optical waveguide WG1 and the optical waveguide WG2 having mutually different cross sectional sizes.

Thereafter, the laser light reduced in spot size by the spot size converter SSC propagates through the optical waveguide WG1. In the manner described up to this point, with the semiconductor device in the present First Embodiment, the laser light emitted from the semiconductor laser can be propagated between the optical waveguide WG1 and the optical waveguide WG2 having mutually different widths and heights through the path from the light emitting part LU of the semiconductor laser LD via the optical waveguide part OGU of the spot size converter SSC to the optical waveguide WG1 without causing a large light loss.

Manufacturing Method of Semiconductor Device

Subsequently, a method for manufacturing a semiconductor device in the present First Embodiment will be described from the viewpoint of describing the outline of the technical idea in the present First Embodiment. The method for manufacturing a semiconductor device in the present First Embodiment is mainly the same as the method for manufacturing a semiconductor device in Second Embodiment, except that the interlayer insulation layer IL and the optical waveguide part OGU are formed at two stages. For this reason, the method for manufacturing a semiconductor device in the present First Embodiment will be described briefly, and the details of the method for manufacturing a semiconductor device will be described in details in Second Embodiment.

In the method for manufacturing a semiconductor device in the present First Embodiment, first, a semiconductor wafer (SOI wafer) formed of a base material layer, an insulation layer formed over the base material layer, and a semiconductor layer formed over the insulation layer is provided. Then, the semiconductor layer is patterned, thereby to form an optical waveguide (WG1). Thereafter, an interlayer insulation layer (IL) is formed over the insulation layer in such a manner as to cover the optical waveguide (WG1). Subsequently, a plurality of openings (through parts) are formed across from the portion covering the one end (EP1) of the optical waveguide (WG) to the portion separated from the one end (EP1) of the optical waveguide (WG) of the interlayer insulation layer (IL). Then, a film formed of a material having a higher refractive index than the refractive index of the interlayer insulation layer (IL) is buried in each inside of the plurality of openings (through parts). In the present embodiment, a silicon nitride film is buried in each inside of the plurality of openings (through parts). In other words, a plurality of openings penetrating through the interlayer insulation layer (IL) in the thickness direction, and separated from one another are formed across from the portion covering one end (EP1) of the optical waveguide (WG) to one portion formed over the insulation layer (BOX) of the interlayer insulation layer (IL). A film having a higher refractive index than that of the interlayer insulation layer (IL) is buried in each inside of the plurality of openings.

In this manner, in accordance with the present First Embodiment, there is formed the optical waveguide part (OGU) which has a larger width than the width of the optical waveguide (WG1), and has a larger height than the height of the optical waveguide (WG1), and whose one end (EP2a) is arranged over the optical waveguide (WG1), and whose other end (EP2b) forms the side surface separated from one end (EP1a) of the optical waveguide (WG1), and which can propagate a light therethrough.

Features in First Embodiment

Then, the features in the present First Embodiment will be described. The features of the present First Embodiment resides in the following point: based on a semiconductor device in which the optical waveguide WG1 formed at the same layer as that of a microscopic optical device, and the spot size converter are integrally formed, for example, as shown in FIGS. 3 and 4, the optical waveguide part OGU of the constituent element of the spot size converter SSC includes a plurality of optical waveguide bodies OG. As a result, in accordance with the present First Embodiment, for implementing a semiconductor device capable of suppressing a large light loss between the optical waveguides having mutually different widths and heights, for example, an optical waveguide formed at the same layer as that of the optical device, and having a size of a submicron order, and the spot size converter including the optical waveguide part of a several-micron order can be integrally formed by a semiconductor manufacturing technology.

At this step, in the present First Embodiment, there is adopted a technology of not forming the optical waveguide part OGU from a film obtained by adding an element for increasing the refractive index to a silicon oxide film, but forming the optical waveguide part OGU from a film having a higher refractive index than that of the cladding layer CLD formed of a silicon oxide film. That is, in the present First Embodiment, it is assumed that the optical waveguide part OGU of the spot size converter SSC is formed of a silicon nitride film also often used with a semiconductor manufacturing technology. Then, as a method for manufacturing the presupposed configuration, there is the following method: after forming a silicon oxide film with a thickness of a several-micron order, an opening with a large size corresponding to the optical waveguide part OGU is formed in the silicon oxide film; and a silicon nitride film is buried in the inside of the opening. However, it is difficult form a silicon nitride film in such a manner as to fill the large opening with a size of a several-micron order. That is, the present First Embodiment is implemented upon recognizing the necessity of studying the alternative plan because with a semiconductor manufacturing technology, it is difficult to form a silicon nitride film in such a manner as to fill the opening with a size of a several-micron order.

Then, the present inventors encountered a difficulty in burying a silicon nitride film in the opening with a size of a several-micron order by a semiconductor manufacturing technology. As a result, the present inventors have arrived at the idea of forming a plurality of optical waveguide bodies OG in place of forming an opening with a large size. In this case, even when the interval of the plurality of optical waveguide bodies OG is adjusted, thereby to form the optical waveguide part OGU from the plurality of optical waveguide bodies OG discretely arranged, it becomes possible to propagate a light inside the optical waveguide part OGU. Specifically, the technical idea in the present First Embodiment is the idea of providing a plurality of optical waveguide bodies OG inside the optical waveguide part OGU, and implementing the propagation of a light inside the optical waveguide part OGU with an evanescent light. When the optical waveguide part OGU serving as the constituent element of the spot size converter SSC is thus formed from a plurality of optical waveguide bodies OG with a small size, it becomes possible to implement the technical idea even by a semiconductor manufacturing technology for use in forming a microscopic optical device. Then, even when the optical waveguide part OGU serving as the constituent element of the spot size converter SSC is formed from a plurality of optical waveguide bodies OG with a small size, by setting the interval of the plurality of optical waveguide bodies OG smaller than the seeping distance of an evanescent light, it becomes possible to propagate a light inside the optical waveguide part OGU. In the manner described up to this point, based on the technical idea in the present First Embodiment, the optical waveguide part OGU of the constituent element of the spot size converter SSC is formed so as to include a plurality of optical waveguide bodies OG. As a result, according to the features in the present First Embodiment, it is possible to readily and properly form a spot size converter including, for example, an optical waveguide having a size of a submicron order, and an optical waveguide part of a several-micron order in implementing a semiconductor device capable of suppressing a large light loss between the optical waveguides having mutually different widths and heights.

Second Embodiment

Room for Further Improvement

In accordance with the First Embodiment described above, a spot size converter including an optical waveguide having a size of a submicron order, and an optical waveguide part of a several-micron order, and an optical integrated circuit can be integrally formed by a semiconductor manufacturing technology. However, in the First Embodiment, for example, as shown in FIG. 4, each of the plurality of optical waveguide bodies OG forming the optical waveguide part OGU is formed in such a manner as to penetrate through the interlayer insulation layer IL having a thickness of a several-micron order. In this case, the aspect ratio (height/width) of the opening formed in the interlayer insulation layer IL for forming the optical waveguide body OG increases. This means that there is room for improving the filling characteristic for filling the opening by a silicon nitride film. That is, an increase in aspect ratio (height/width) of the opening formed in the interlayer insulation layer IL may generate voids upon filling the opening with a silicon nitride film according to the manufacturing conditions, which increases the fear of causing defective formation of the optical waveguide body OG. Under such circumstances, in the present Second Embodiment, elaborate measures of reducing the aspect ratio (height/width) of the opening formed in the interlayer insulation layer IL for forming the optical waveguide body OG are taken while adopting the basic idea in the First Embodiment. Below, the technical idea in the present Second Embodiment in which the measures have been taken will be described.

Configuration of Semiconductor Device

Figure 5:
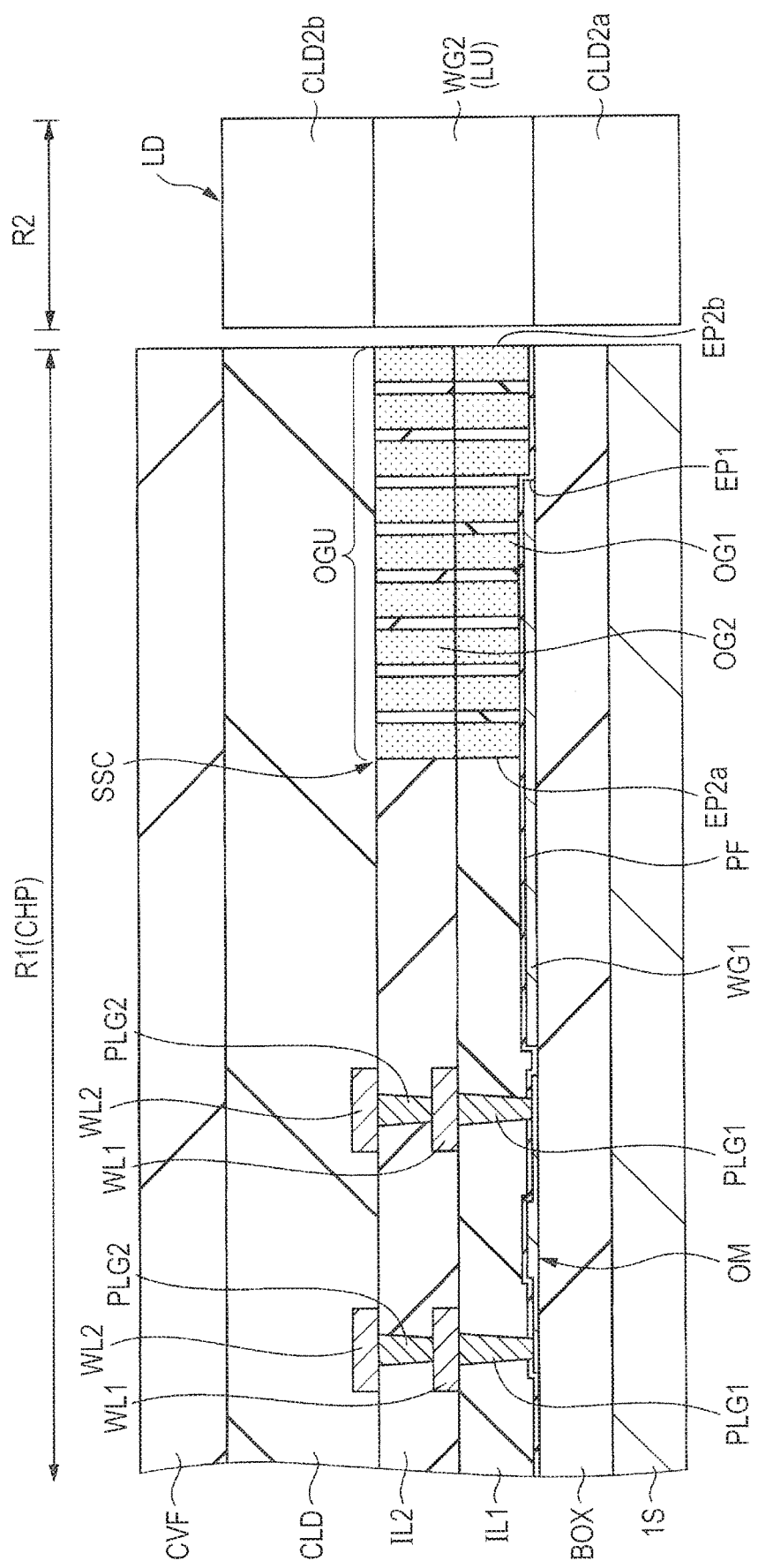
FIG. 5 is a cross sectional view schematically showing a configuration of a semiconductor device in Second Embodiment.

FIG. 5 is a cross sectional view schematically showing a configuration of a semiconductor device in the present Second Embodiment. In FIG. 5, a semiconductor chip CHP in the present Second Embodiment has a region R1 and a region R2. In the region R1 of the semiconductor chip CHP, for example, an optical modulator OM of one of optical devices, an optical waveguide WG1 formed at the same layer as that of the optical modulator OM, and a spot size converter optically coupled with the optical waveguide WG1 are formed. On the other hand, in the region R2 outside the semiconductor chip CHP, a semiconductor laser LD of a light emitting element is formed.

As the optical modulator OM, for example, a known configuration can be adopted as the optical modulator in silicon photonics. The optical modulator OM modulates the phase of a light using a carrier plasma effect (a phenomenon in which the refractive index of an optical waveguide depends upon the carrier (electron hole pair) density in the semiconductor forming the optical waveguide). That is, for the optical waveguide WG1 of a pin junction or pn junction diode structure, the diode is applied with a forward bias (reverse bias), thereby to implant carriers into (attract carriers from) the optical waveguide WG1, for reducing (increasing) the refractive index of the optical waveguide WG1. As a result, the phase of the light is modulated.

In the region R1 of the semiconductor chip CHP, a protective film PF formed of, for example, a silicon oxide film is formed in such a manner as to cover the optical modulator OM and the optical waveguide WG1. An interlayer insulation layer IL1 formed of, for example, a silicon oxide film is formed in such a manner as to cover the optical modulator OM and the optical waveguide WG1 via the protective film PF. Then, as shown in FIG. 5, plugs PLG1 penetrating through the interlayer insulation layer IL1 are formed in the interlayer insulation layer IL1. The plugs PLG1 are coupled with the optical modulator OM. Further, over the interlayer insulation layer IL1, a wire ML1 formed of, for example, an aluminum film is formed. The wire WL1 is electrically coupled with the plugs PLG1. Further, in the interlayer insulation layer IL1, a plurality of optical waveguide bodies OG1 penetrating through the interlayer insulation layer IL1 are formed. The plurality of optical waveguide bodies OG1 become the constituent element of the optical waveguide part OGU of the spot size converter.

Then, as shown in FIG. 5, an interlayer insulation layer IL2 formed of, for example, a silicon oxide film is formed over the interlayer insulation layer IL in such a manner as to cover the wire WL1. Then, in the interlayer insulation layer IL2, plugs PLG2 penetrating through the interlayer insulation layer IL2 are formed. The plugs PLG2 are electrically coupled with the wire WL1 covered with the interlayer insulation layer IL2. Further, over the interlayer insulation layer IL2 including the plugs PLG2 formed therein, a wire WL2 formed of an aluminum film is formed. The plugs PLG2 and the wire WL2 are electrically coupled with each other. Further, in the interlayer insulation layer IL2, a plurality of optical waveguide bodies OG2 penetrating through the interlayer insulation layer IL2 are formed. The plurality of optical waveguide bodies OG2 become the constituent element of the optical waveguide part OGU of the spot size converter. From the description up to this point, in the present Second Embodiment, the optical waveguide part OGU of the spot size converter includes the plurality of optical waveguide bodies OG1 formed in such a manner as to penetrate through the interlayer insulation layer IL1 and the plurality of optical waveguide bodies OG2 formed in such a manner as to penetrate through the interlayer insulation layer IL2.

Further, although not shown in FIG. 5, over the second-layer interlayer insulation layer IL2, a further third-layer interlayer insulation layer is formed. The optical waveguide part OGU of the spot size converter may also include a plurality of optical waveguide bodies penetrating through the third-layer interlayer insulation layer in the thickness direction together with the plurality of optical waveguide bodies OG1, and the plurality of optical waveguide bodies OG2.

Herein, as shown in FIG. 5, the optical waveguide body OG1 and the optical waveguide body OG2 are arranged in such a manner as to completely overlap each other. However, the present invention is not limited thereto. For example, the optical waveguide body OG1 and the optical waveguide body OG2 may be arranged shifted from each other in the direction perpendicular to the height direction of the optical waveguide bodies OG1 and OG2 in such a manner as to partially overlap each other, or further, may be arranged shifted from each other in the direction perpendicular to the height direction of the optical waveguide bodies OG1 and OG2 in such a manner as not to overlap at all.

In FIG. 5, a first interval between mutually adjacent two optical waveguide bodies OG1 of the plurality of optical waveguide bodies OG1 is smaller than the seeping distance of an evanescent light. In addition, a second interval between mutually adjacent two optical waveguide bodies OG2 of the plurality of optical waveguide bodies OG2 is smaller than the seeping distance of an evanescent light. The first interval and the second interval are each, for example, about 0.1 μm. The first interval and the second interval may be equal to each other, or may be different from each other. In the present embodiment, the first interval and the second interval are equal to each other.

Further, the total height of the optical waveguide body OG1 and the optical waveguide body OG2 is determined according to the size of the emitting surface of the optical waveguide WG2, and is, for example, 3.0 μm. The height of the optical waveguide body OG1 and the height of the optical waveguide body OG2 may be equal to each other, or may be different from each other. In the present First Embodiment, the height of the optical waveguide body OG1 and the height of the optical waveguide body OG2 are equal to each other. Respective heights of the optical waveguide body OG1 and the optical waveguide body OG2 are both, for example, 1.5 μm.

The size of each cross section perpendicular to the height direction of the optical waveguide body OG1 and the optical waveguide body OG2 has no particular restriction. The sizes of the cross sections perpendicular to the height direction of the optical waveguide body OG1 and the optical waveguide body OG2 may be equal to each other, or may be different from each other. In the present embodiment, the sizes of the cross sections perpendicular to the height direction of the optical waveguide body OG1 and the optical waveguide body OG2 are equal to each other. For example, the diameters at the cross sections perpendicular to the height direction of the optical waveguide body OG1 and the optical waveguide body OG2 are both about 0.3 μm.

Any number of the optical waveguide bodies OG1 and the optical waveguide bodies OG2 is acceptable so long as the optical waveguide WG1 and the optical waveguide WG2 can be optically coupled with each other, and may be appropriately determined according to respective widths, heights, and the like of the optical waveguide body OG1 and the optical waveguide body OG2.

Further, each stereoscopic shape of the plurality of optical waveguide bodies OG1 is a columnar shape, and each stereoscopic shape of the plurality of optical waveguide bodies OG2 is also a columnar shape. In this case, the plurality of optical waveguide bodies OG1 are arranged at a prescribed pitch in a first direction in which the optical waveguide WG1 extends, and are also arranged at a prescribed pitch in a second direction orthogonal to the first direction. Similarly, the plurality of optical waveguide bodies OG2 are arranged at a prescribed pitch in the first direction, and are also arranged at a prescribed pitch in the second direction.

Method for Manufacturing Semiconductor Device

The semiconductor device in the present Second Embodiment is configured as described above. Below, the manufacturing method will be described by reference to the accompanying drawings.

Figure 6:
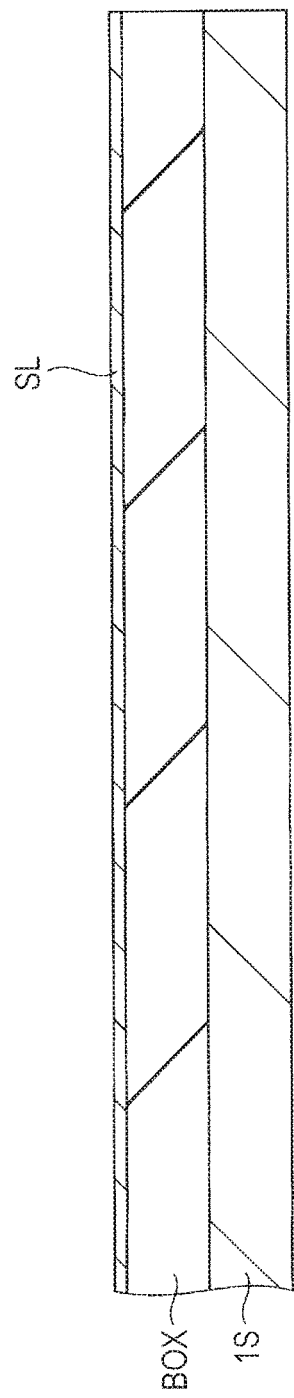
FIG. 6 is a cross sectional view showing a semiconductor device during a manufacturing step in Second Embodiment.

First, as described in FIG. 6, a SOI substrate formed of a semiconductor substrate (substrate layer 1S) formed of silicon, an insulation layer BOX formed of a silicon oxide film formed over the semiconductor substrate, and a semiconductor layer SL formed of silicon formed over the insulation layer BOX is provided. At this step, for example, the thickness of the insulation layer BOX is about 3.0 µm, and the thickness of the semiconductor layer SL is about 0.2 µm to 0.5 µm. The SOI substrate has a plurality of element formation regions (chip regions).

Figure 7:
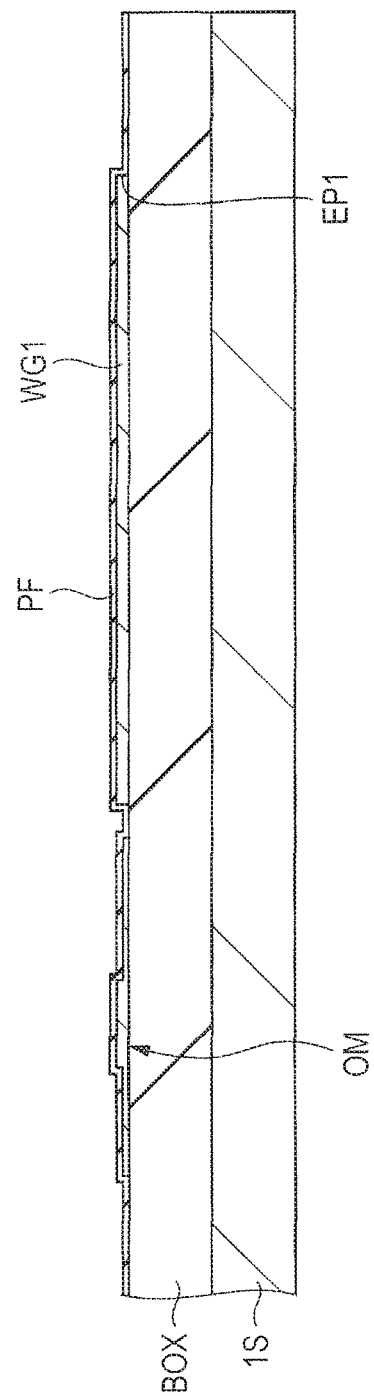
FIG. 7 is across sectional view showing the semiconductor device during a manufacturing step following FIG. 6.

Then, as shown in FIG. 7, using a photolithography technology and an etching technology, the semiconductor layer SL is patterned. As a result, in each of the plurality of element formation regions, an optical waveguide WG1 and an optical modulator OM are formed over the insulation layer BOX. Then, a protective film PF formed of, for example, a silicon oxide film is formed in such a manner as to cover the optical modulator OM and the optical waveguide WG1. Any thickness of the protective film PF is acceptable so long as the thickness can prevent the optical waveguide WG1 from being damaged by overetching when an opening OP1 is formed in the interlayer insulation layer IL1. For example, the thickness of the protective film PF is about 50 nm.

Figure 8:
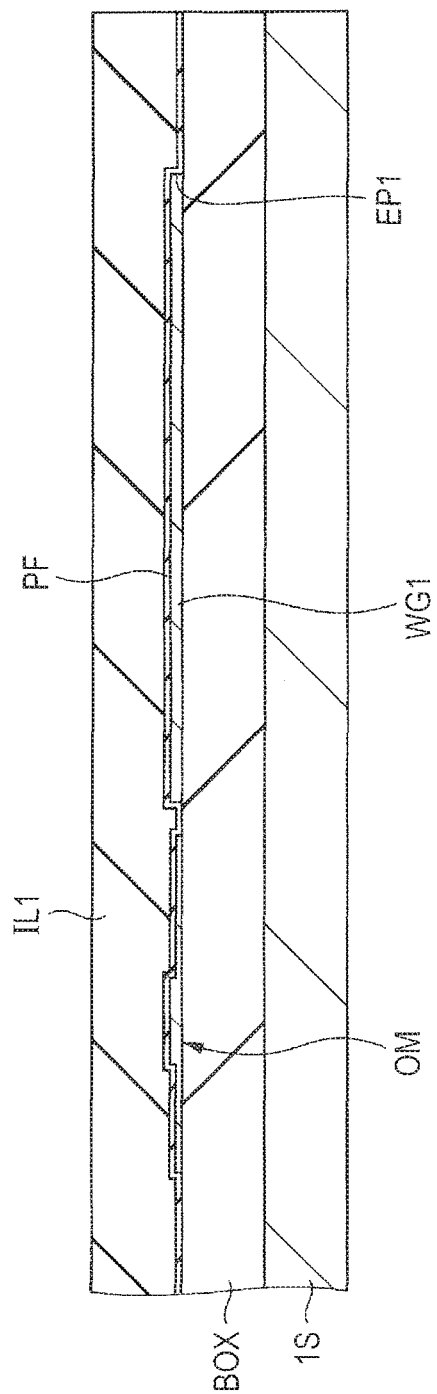
FIG. 8 is across sectional view showing the semiconductor device during a manufacturing step following FIG. 7.

Subsequently, as shown in FIG. 8, by using, for example, a CVD (Chemical Vapor Deposition) method, an interlayer insulation layer IL1 formed of a silicon oxide film with a thickness of about 1.5 µm is formed. Then, by using, for example, a CMP method: Chemical Mechanical Polishing, the surface of the interlayer insulation layer IL1 is planarized.

Figure 9:
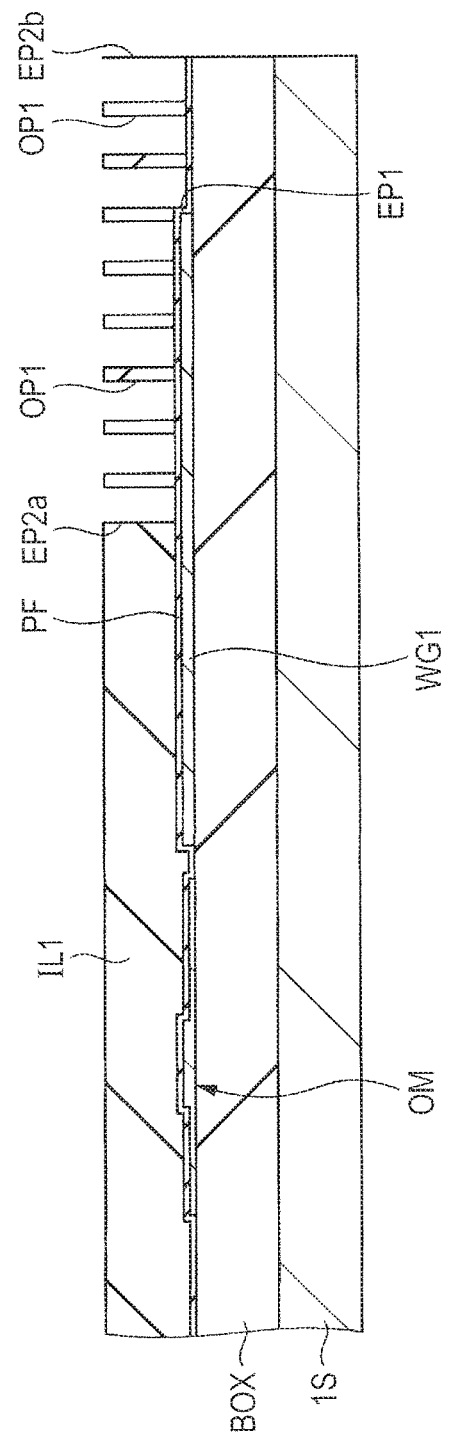
FIG. 9 is across sectional view showing the semiconductor device during a manufacturing step following FIG. 8.

Then, as shown in FIG. 9, using a photolithography technology and an etching technology, in each of the plurality of element formation regions, a plurality of openings (through parts) OP1 penetrating through the interlayer insulation layer IL1 are formed in the interlayer insulation layer IL1. Specifically, in each of the plurality of element formation regions, a plurality of openings OP1 penetrating through the interlayer insulation layer IL1 in the thickness direction, and separated from one another are formed across from the portion covering one end EP1 of the optical waveguide WG1 to one portion formed over the insulation layer BOX of the interlayer insulation layer IL1.

At this step, each of the plurality of openings OP1 has, for example, a diameter of about 0.3 µm, and a depth of about 1.5 µm. Further, the interval of the plurality of openings OP1 is about 0.1 µm. Incidentally, the plurality of openings OP1 include the openings OP1 overlapping the optical waveguide WG1 in a plan view, and the openings OP1 not overlapping the optical waveguide WG1 in a plan view. In other words, the plurality of openings OP1 include the openings OP1 overlapping the optical waveguide WG1 in a plan view, and the openings OP1 separated from the optical waveguide WG1 in a plan view.

Figure 10:
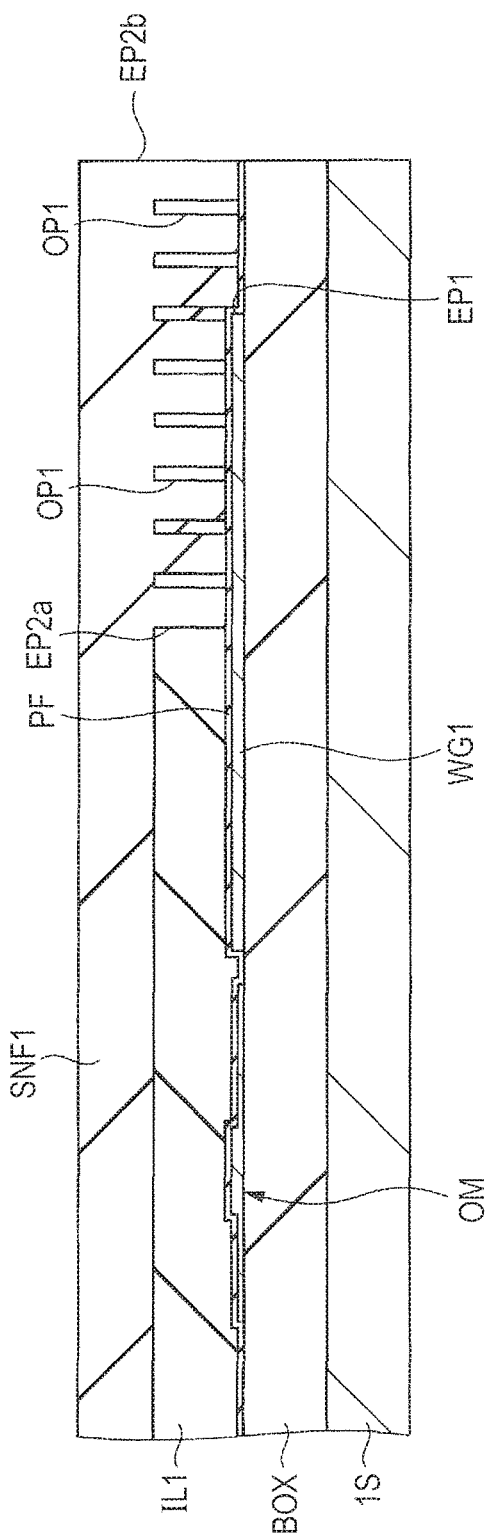
FIG. 10 is a cross sectional view showing the semiconductor device during a manufacturing step following FIG. 9.

Then, as shown in FIG. 10, over the interlayer insulation layer IL1 including the inside of each opening OP1, a silicon nitride film SNF1 is formed. For the thickness of the silicon nitride film SNF1, the silicon nitride film SNF1 is formed by, for example, a LP-CVD method so that the thickness of the silicon nitride film SNF1 over the interlayer insulation layer IL1 is about 0.2 µm. As a result, the inside of the opening OP1 can be filled with the silicon nitride film SNF1.

Figure 11:
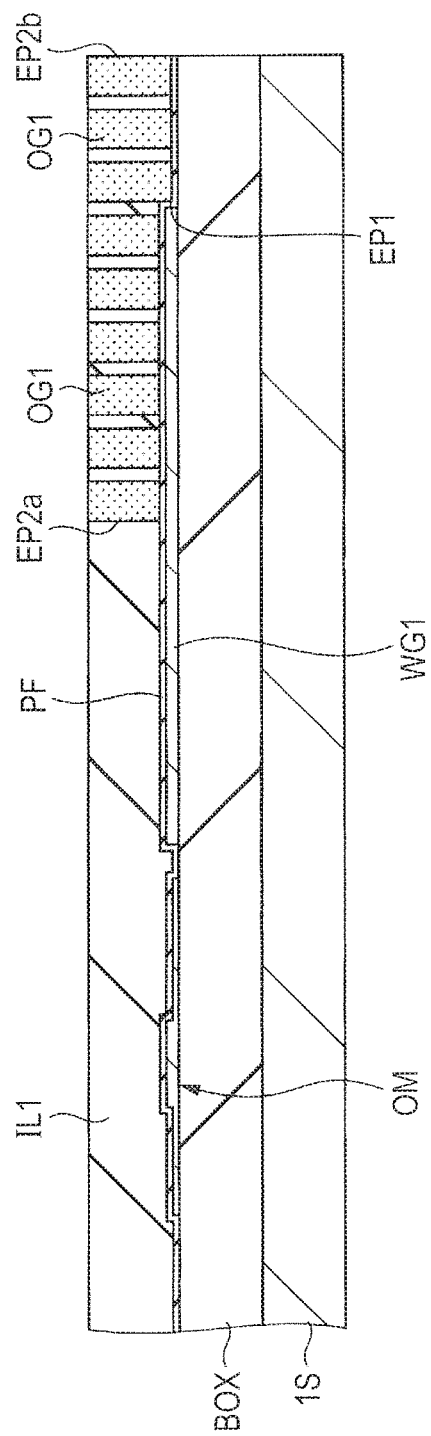
FIG. 11 is a cross sectional view showing the semiconductor device during a manufacturing step following FIG. 10.

Then, as shown in FIG. 11, for example, using a CMP method, the unnecessary portions of the silicon nitride film SNF1 formed over the interlayer insulation layer IL1 are removed. On the other hand, the portions of the silicon nitride film SNF1 buried in the inside of each opening OP1 are left. This results in the formation of the optical waveguide body OG1 in which the silicon nitride film SNF1 is buried in the inside of the opening OP1.

Figure 12:
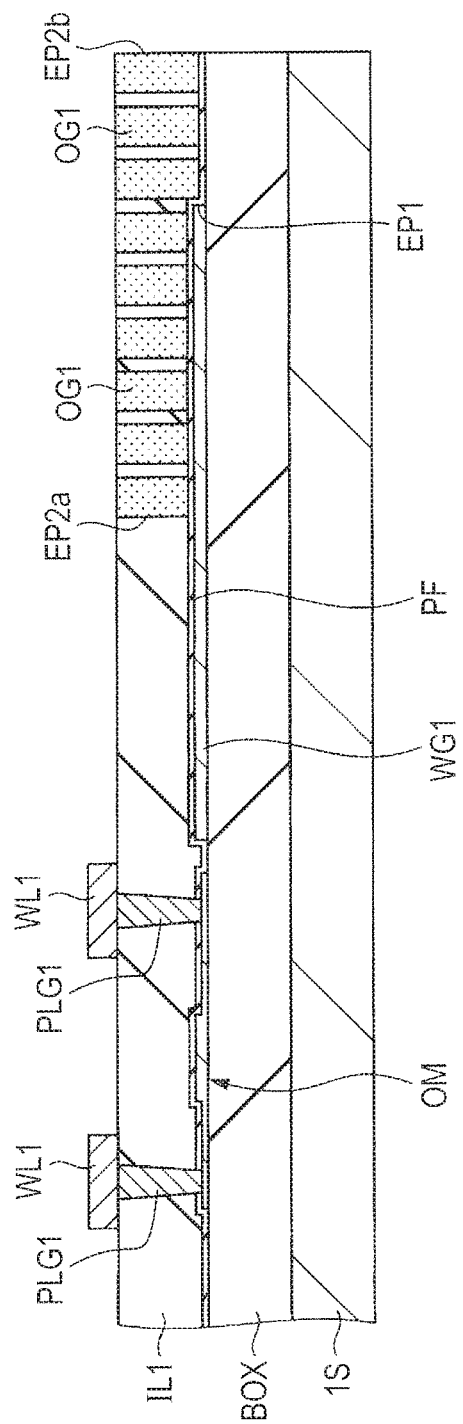
FIG. 12 is a cross sectional view showing the semiconductor device during a manufacturing step following FIG. 11.

Subsequently, as shown in FIG. 12, using a photolithography technology and an etching technology, contact holes reaching the optical modulator OM are formed in the interlayer insulation layer IL1. Then, a barrier conductor film (a lamination film of a titanium film and a titanium nitride film), and a tungsten film are buried in the inside of each of the contact holes, thereby to form a plug PLG1 penetrating through the interlayer insulation layer IL1. Then, over the interlayer insulation layer IL1, using, for example, a sputtering method, the barrier conductor film and an aluminum film are formed. Then, using a photolithography technology and an etching technology, the aluminum film and the barrier conductor film are patterned. As a result, the wire WL1 to be electrically coupled with the plug PLG1 can be formed over the interlayer insulation layer IL1.

Figure 13:
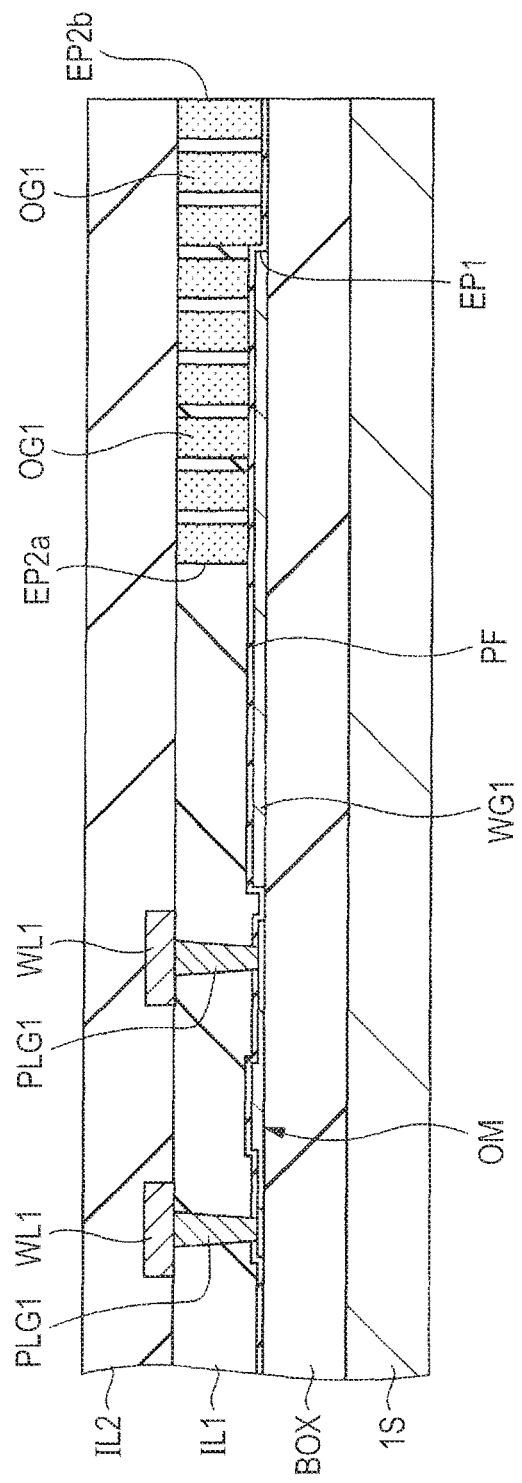
FIG. 13 is a cross sectional view showing the semiconductor device during a manufacturing step following FIG. 12.

Then, as shown in FIG. 13, over the interlayer insulation layer IL1 including the wire WL1 formed therein, using, for example, a CVD method, an interlayer insulation layer IL2 formed of a silicon oxide film with a thickness of about 1.5 µm is formed. Then, using, for example, a CMP method, the surface of the interlayer insulation layer IL2 is planarized.

Figure 14:
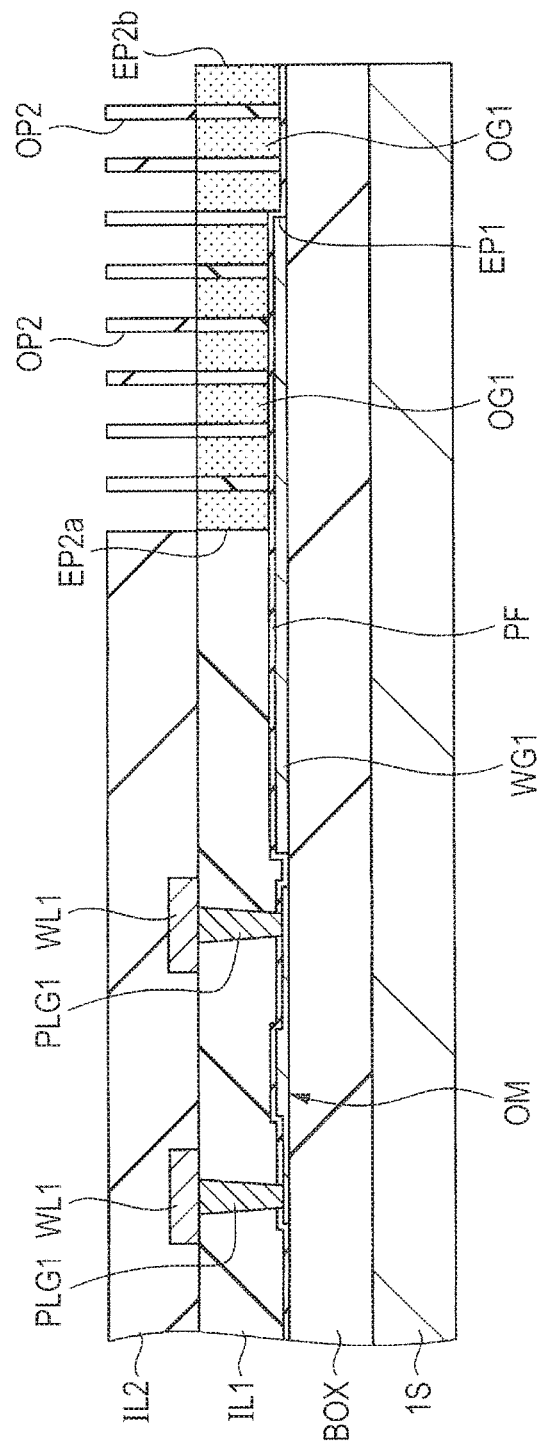
FIG. 14 is a cross sectional view showing the semiconductor device during a manufacturing step following FIG. 13.

Then, as shown in FIG. 14, using a photolithography technology and an etching technology, in each of the plurality of element formation regions, a plurality of openings OP2 penetrating through the interlayer insulation layer IL2 are formed in the interlayer insulation layer IL2. Specifically, in each of the plurality of element formation regions, a plurality of openings OP2 penetrating through the interlayer insulation layer IL2 in the thickness direction, and separated from one another are formed across from the portion formed over the interlayer insulation layer IL1 covering one end EP1 of the optical waveguide WG1 to one portion formed over the interlayer insulation layer IL1 over the insulation layer BOX.

At this step, each of the plurality of openings OP2 has, for example, a diameter of about 0.3 µm, and a depth of about 1.5 µm. Further, the interval between two openings OP2 adjacent to each other of the plurality of openings OP2 is about 0.1 µm.

Figure 15:
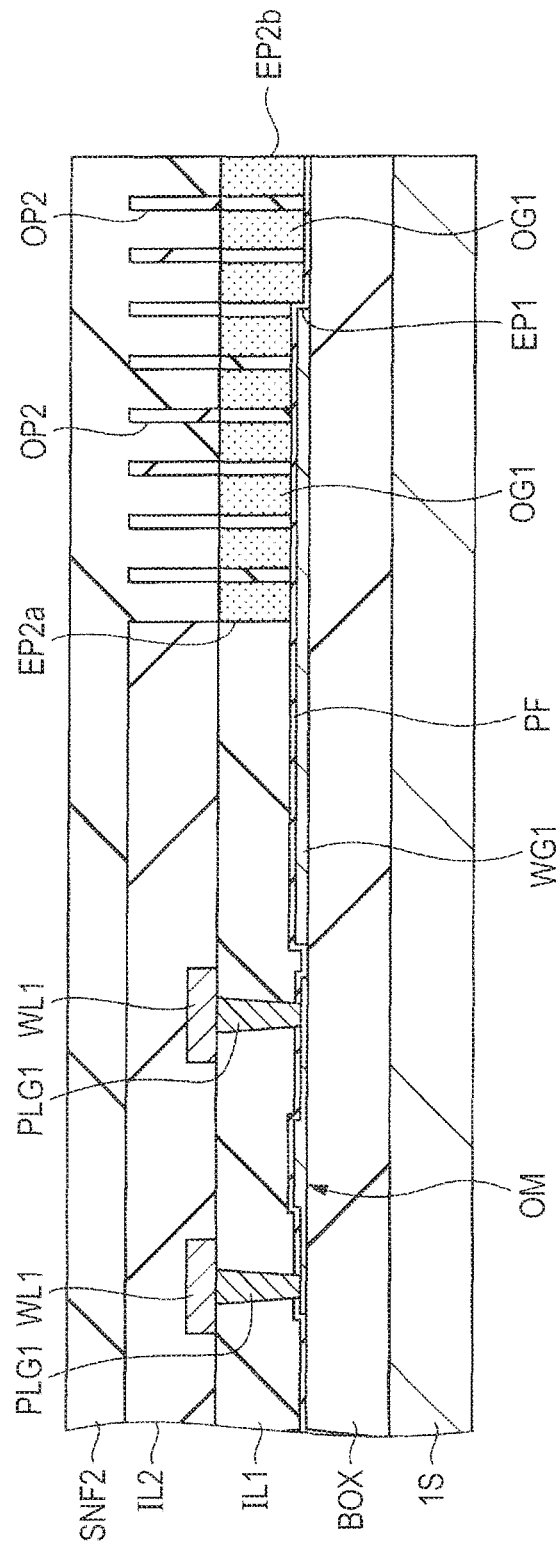
FIG. 15 is a cross sectional view showing the semiconductor device during a manufacturing step following FIG. 14.

Then, as shown in FIG. 15, over the interlayer insulation layer IL2 including the inside of each opening OP2, a silicon nitride film SNF2 is formed. The silicon nitride film SNF1 is formed by, for example, a LP-CVD method so that the thickness of the silicon nitride film SNF1 over the interlayer insulation layer IL1 is about 0.2 µm. As a result, the inside of the opening OP1 can be filled with the silicon nitride film SNF1.

Figure 16:
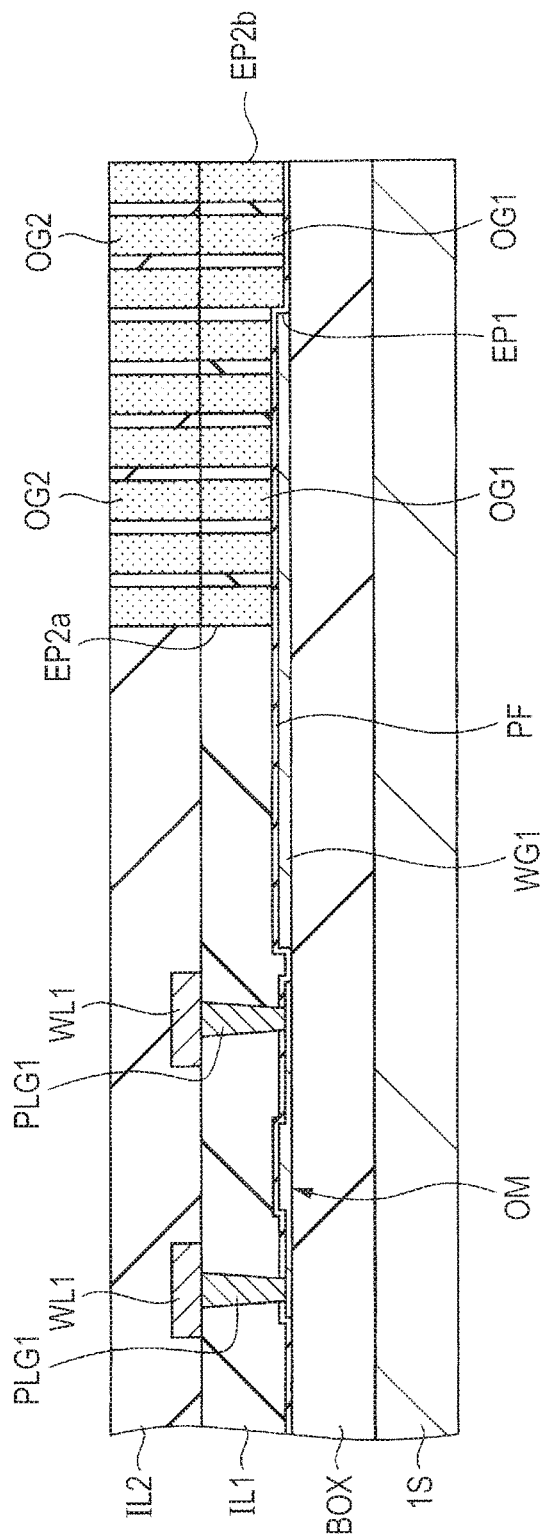
FIG. 16 is a cross sectional view showing the semiconductor device during a manufacturing step following FIG. 15.

Then, as shown in FIG. 16, for example, using a CMP method, the unnecessary portions of the silicon nitride film SNF2 formed over the interlayer insulation layer IL2 are removed. On the other hand, the portions of the silicon nitride film SNF2 buried in the inside of each opening OP2 are left. This results in the formation of the optical waveguide body OG2 in which the silicon nitride film SNF2 is buried in the inside of the opening OP2.

Figure 17:
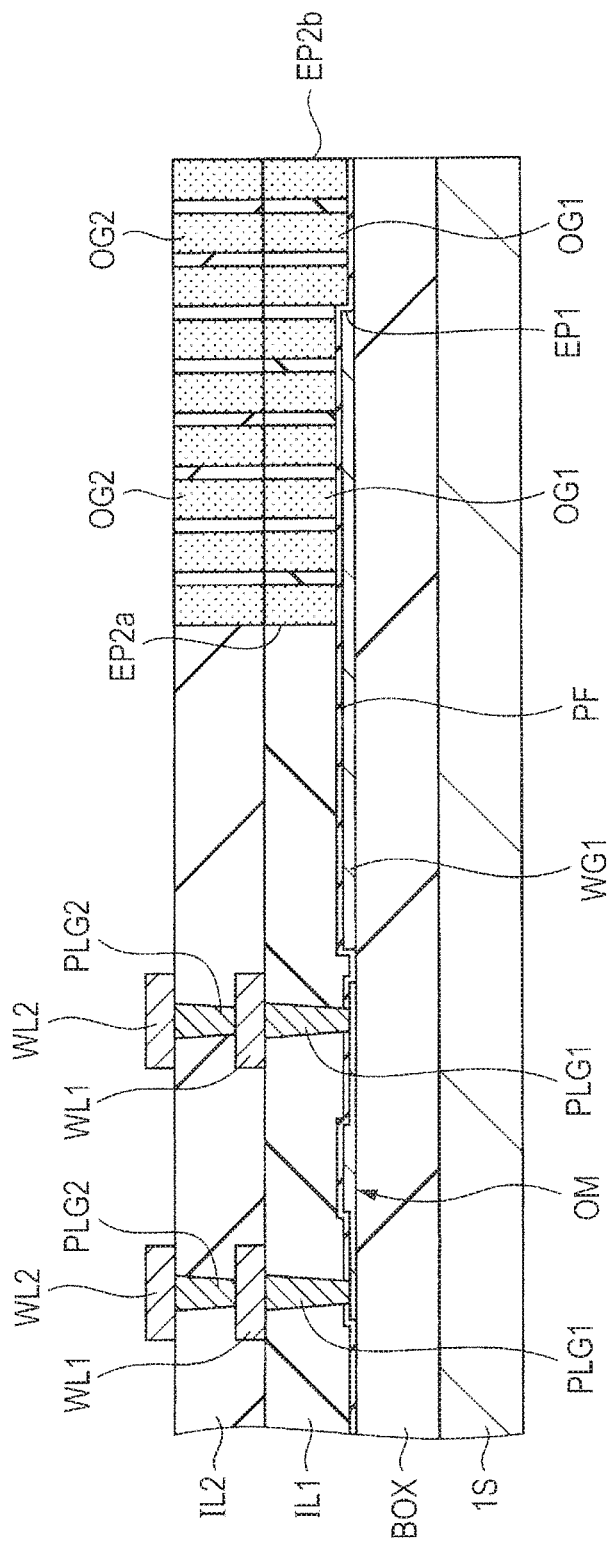
FIG. 17 is a cross sectional view showing the semiconductor device during a manufacturing step following FIG. 16.

Subsequently, as shown in FIG. 17, using a photolithography technology and an etching technology, contact holes reaching the wire WL1 are formed in the interlayer insulation layer IL2. Then, a barrier conductor film (a lamination film of a titanium film and a titanium nitride film), and an aluminum film are buried in the inside of each of the contact holes, thereby to form a plug PLG2 penetrating through the interlayer insulation layer IL2. Then, over the interlayer insulation layer IL2, using, for example, a sputtering method, the barrier conductor film and an aluminum film are formed. Then, using a photolithography technology and an etching technology, the aluminum film and the barrier conductor film are patterned. As a result, the wire WL2 electrically coupled with the plug PLG2 can be formed over the interlayer insulation layer IL2.

Then, over the interlayer insulation layer IL2 including the wire WL2 formed therein, a cladding layer CLD formed of, for example, a silicon oxide film is formed. The subsequent steps are omitted. In the manner described up to this point, the semiconductor device in the present Second Embodiment can be manufactured. Incidentally, in the method for manufacturing a semiconductor device in the present Second Embodiment thus described, the steps shown in FIGS. 6 to 12 are used. As a result, for example, the semiconductor device in the First Embodiment shown in FIG. 5 can be manufactured.

Feature of Second Embodiment

Then, the feature in the present Second Embodiment will be described. The feature in the present Second Embodiment resides in that, for example, as shown in FIG. 5, the optical waveguide part OGU of the spot size converter includes a plurality of optical waveguide bodies OG1 formed at the interlayer insulation layer IL1, and a plurality of optical waveguide bodies OG2 formed at the interlayer insulation layer IL2.

For example, the plurality of optical waveguide bodies OG1 can be formed by going through the manufacturing steps in FIGS. 8 to 11. At this step, the thickness of the interlayer insulation layer IL1 in the present Second Embodiment is, for example, about 1.5 μm, and is smaller than the thickness (about 3.0 μm) of the interlayer insulation layer IL in the First Embodiment. This means that, for example, the aspect ratio of the opening OP1 in the present Second Embodiment formed in the interlayer insulation layer IL1 is smaller than the aspect ratio of the opening in the First Embodiment formed in the interlayer insulation layer IL. Therefore, in accordance with the present Second Embodiment, it is possible to improve the filling characteristics for burying the silicon nitride film SNF1 in the opening OP1. That is, by adopting the method for manufacturing a semiconductor device in the present Second Embodiment, it is possible to surely bury the silicon nitride film SNF1 in the inside of the opening OP1 formed in such a manner as to penetrate through the interlayer insulation layer IL1. This can improve the manufacturing ease of the optical waveguide body OG1.

Similarly, the plurality of optical waveguide bodies OG2 can be formed by going through the manufacturing steps shown in FIGS. 12 to 16. At this step, the thickness of the interlayer insulation layer IL2 in the present Second Embodiment is, for example, about 1.5 μm, and is smaller than the thickness (about 3.0 μm) of the interlayer insulation layer IL in the First Embodiment. This means that, for example, the aspect ratio of the opening OP2 in the present Second Embodiment formed in the interlayer insulation layer IL2 is smaller than the aspect ratio of the opening in the First Embodiment formed in the interlayer insulation layer IL. Therefore, in accordance with the present Second Embodiment, it is possible to improve the filling characteristics for burying the silicon nitride film SNF2 in the opening OP2. That is, by adopting the method for manufacturing a semiconductor device in the present Second Embodiment, it is possible to surely bury the silicon nitride film SNF2 in the inside of the opening OP2 formed in such a manner as to penetrate through the interlayer insulation layer IL2. This can improve the manufacturing ease of the optical waveguide body OG2.

Thus, the basic idea in the present Second Embodiment is the idea that a lamination structure of the interlayer insulation layer IL1 and the interlayer insulation layer IL2 each with a thickness of about 1.5 μm smaller than the thickness of the interlayer insulation layer IL in the First Embodiment is adopted, thereby to form the interlayer insulation layer substantially as thick as about 3.0 μm in a plurality of divided steps. Then, in the present Second Embodiment, the basic idea is adopted, thereby to form the optical waveguide bodies OG1 penetrating through the interlayer insulation layer IL1 with a small thickness, and the optical waveguide bodies OG2 penetrating through the interlayer insulation layer IL2 with a small thickness in different steps. Accordingly, in accordance with the present Second Embodiment, the aspect ratio of the opening OP1 for use in formation of the optical waveguide body OG1 can be reduced, and the aspect ratio of the opening OP2 for use in formation of the optical waveguide body OG2 can be reduced. As a result, in accordance with the present Second Embodiment, it is possible to improve the manufacturing ease of the optical waveguide body OG1 and the optical waveguide body OG2.

Particularly, the basic idea in the present Second Embodiment is the idea that the interlayer insulation layer with a large thickness is formed in a plurality of divided steps, and optical waveguide bodies penetrating through each of the plurality of interlayer insulation layers formed in a plurality of divided portions are formed. The basic idea is the idea implemented by finely using the wiring structure to be coupled with the optical device (e.g., an optical modulator). For example, as shown in FIG. 5, in the region R1 of the semiconductor chip CHP, the wiring structure to be coupled with the optical modulator OM is formed. Specifically, the wiring structure has the wire WL1 formed over the interlayer insulation layer IL1, and the wire WL2 formed over the interlayer insulation layer IL2. The steps of forming the wiring structure include, for example, the step of forming the interlayer insulation layer IL1, and the step of forming the interlayer insulation layer IL2. Using the steps, the basic idea in the present Second Embodiment is implemented. In other words, after forming the interlayer insulation layer IL1 for forming the wiring structure, the optical waveguide bodies OG1 are formed at the interlayer insulation layer IL1. In addition, after forming the interlayer insulation layer IL2, the optical waveguide bodies OG2 are formed at the interlayer insulation layer IL2. As a result, in accordance with the present Second Embodiment, when the wiring structure to be coupled with the optical device is formed, the lamination structure of the interlayer insulation layer IL1 and the interlayer insulation layer IL2 is formed. By nicely using this procedure, the optical waveguide bodies OG1 penetrating through the interlayer insulation layer IL1 with a small thickness, and the optical waveguide bodies OG2 penetrating through the interlayer insulation layer IL2 with a small thickness can be formed in different steps, respectively. As a result, in accordance with the present Second Embodiment, using the manufacturing steps of the wiring structure to be coupled with the optical device, the optical waveguide body OG1 and the optical waveguide body OG2 fa be formed. For this reason, it is possible to improve the manufacturing ease of the optical waveguide bodies OG1 and the optical waveguide bodies OG2 while minimizing the increase in manufacturing cost.

MODIFIED EXAMPLE 1

Figure 18:
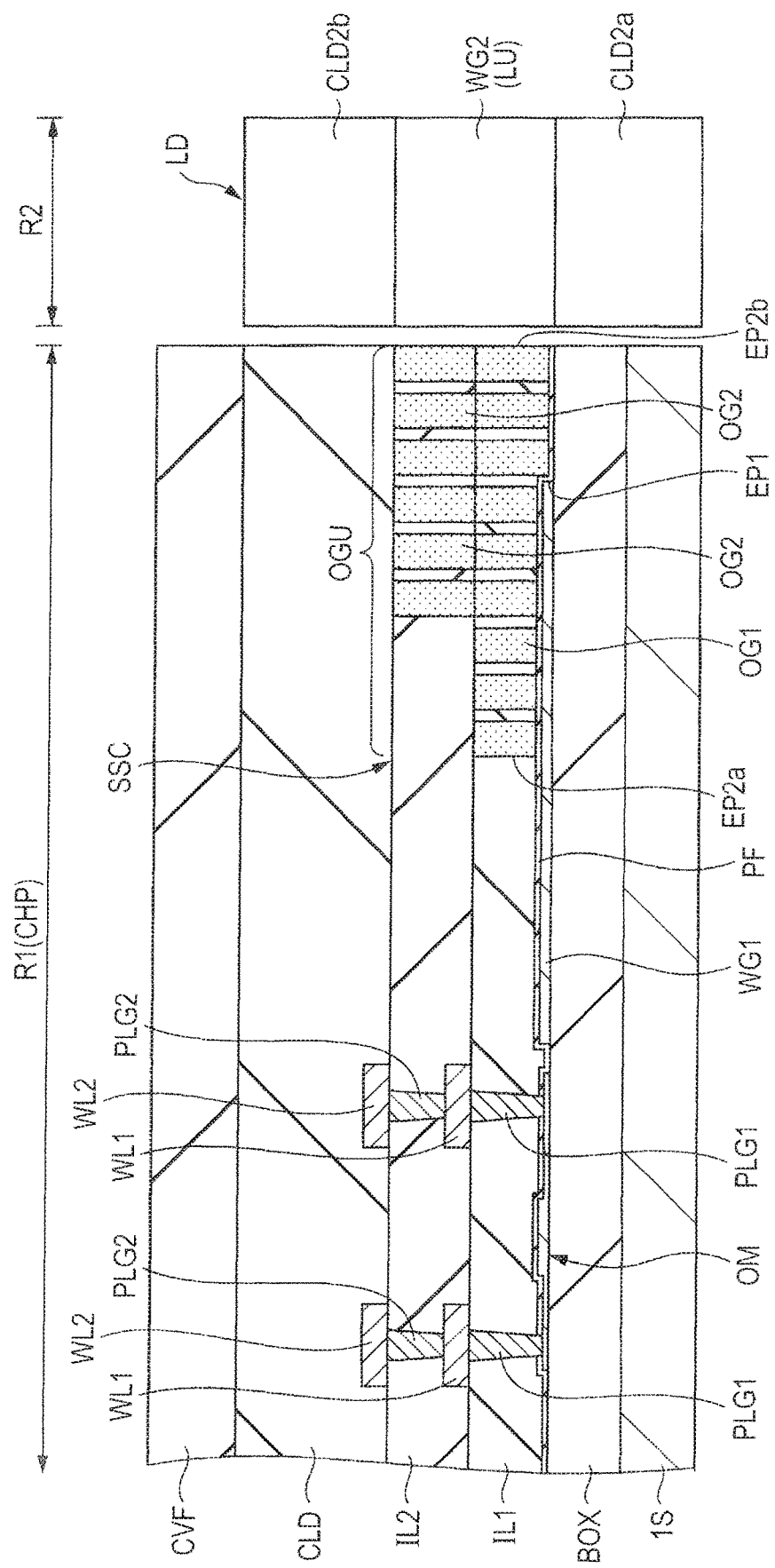
FIG. 18 is a cross sectional view showing a schematic configuration of a semiconductor device in Modified Example 1.

Subsequently, Modified Example 1 of Second Embodiment will be described. FIG. 18 is a cross sectional view showing a schematic configuration of a semiconductor device (semiconductor chip CHP) in the present Modified Example 1. In FIG. 18, in the region R1 of the semiconductor chip CHP, the optical waveguide part OGU of the spot size converter SSC is formed. The optical waveguide part OGU in the present Modified Example 1 has a plurality of optical waveguide bodies OG1 formed in such a manner as to penetrate through the interlayer insulation layer IL1, and a plurality of optical waveguide bodies OG2 in such a manner as to penetrate through the interlayer insulation layer IL2. At this step, in the present Modified Example 1, the number of the plurality of optical waveguide bodies OG2 is smaller than the number of the plurality of optical waveguide bodies OG1. Particularly, in the present Modified Example 1, the distance between the optical waveguide body OG1 arranged at the most distant position from the other end EP2$b$ of the optical waveguide part OGU and the other end EP2$b$ of the optical waveguide part OGU is larger than the distance between the optical waveguide body OG2 arranged at the most distant position from the other end EP2$b$ of the optical waveguide part OGU and the other end EP2$b$ of the optical waveguide part OGU.

With the optical waveguide part OGU thus configured, it is possible to improve the condensing efficiency of a laser light at the optical waveguide part OGU of the spot size converter SSC from the semiconductor laser LD for emitting a laser light with a large spot size toward the optical waveguide WG1 for propagating a laser light with a small spot size therethrough. In other words, in accordance with the present Modified Example 1, while improving the manufacturing ease of the optical waveguide part OGU of the spot size converter SSC, further, the performances of the spot size converter SSC can also be improved.

MODIFIED EXAMPLE 2

Figure 19:
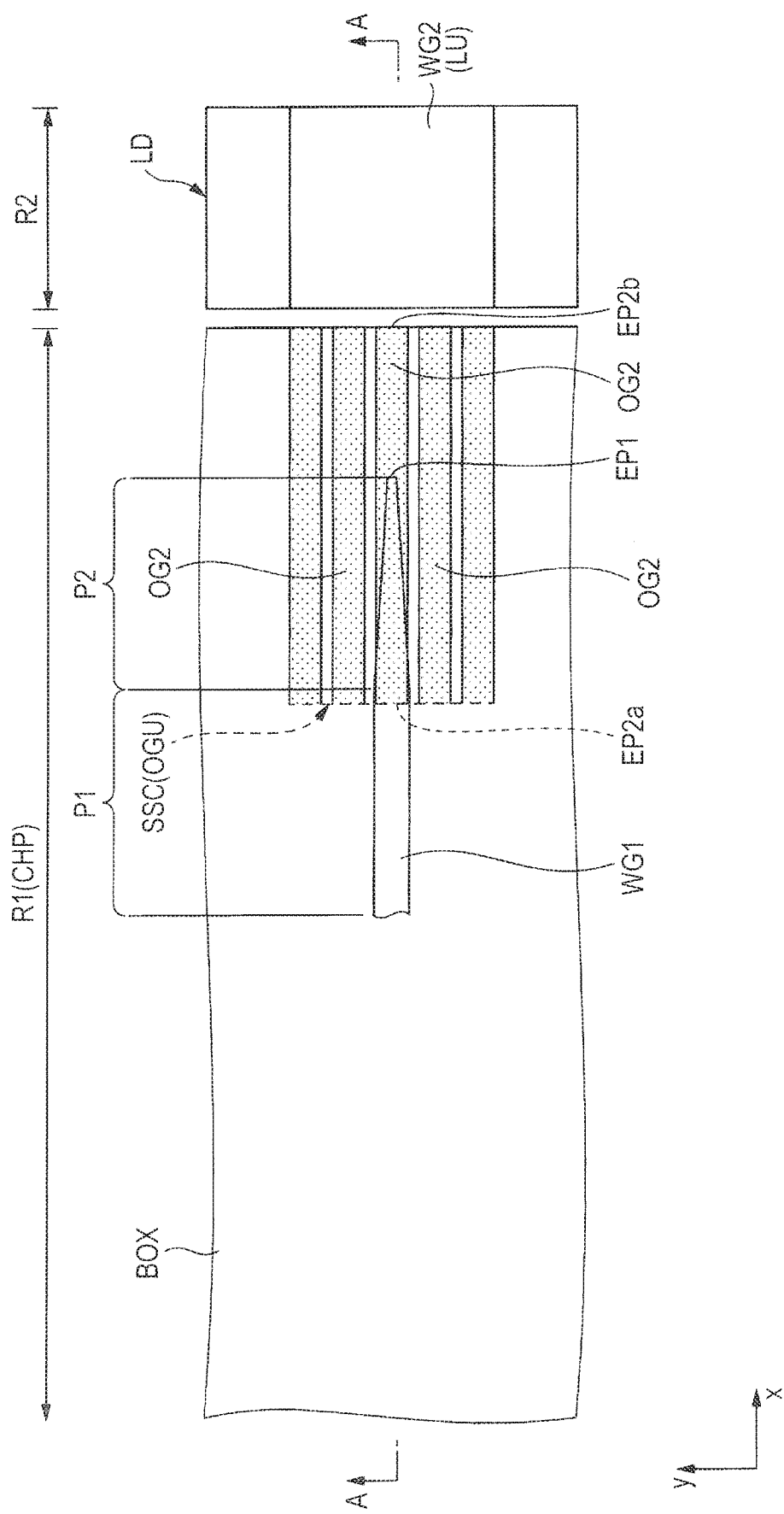
FIG. 19 is a plan view showing a schematic configuration of a semiconductor device in Modified Example 2.

Then, Modified Example 2 of Second Embodiment will be described. FIG. 19 is a plan view showing a schematic configuration of a semiconductor device (semiconductor chip CHP) in the present Modified Example 2. In FIG. 19, in the region R1 of the semiconductor chip CHP, a spot size converter SSC is formed. As shown in FIG. 19, the spot size converter SSC in the present Modified Example 2 has a plurality of optical waveguide bodies OG2. At this step, each stereoscopic shape of the plurality of optical waveguide bodies OG2 is a sheet shape extending in the x direction. In addition, the interval in the y direction of the plurality of sheet-shaped optical waveguide bodies OG2 is smaller than the seeping distance of an evanescent light.

With the spot size converter SSC having the plurality of optical waveguide bodies OG2 thus configured, in the y direction, a light propagates inside the mutually adjacent optical waveguide bodies OG2 by seeping of an evanescent light. On the other hand, each stereoscopic shape of the plurality of optical waveguide bodies OG2 is a sheet shape extending in the x direction. Accordingly, in the x direction, the optical waveguide bodies OG2 are continuously formed. As a result, with the spot size converter SSC in the present Modified Example 2, it is possible to improve the propagation efficiency of a light in the x direction at the spot size converter SSC.

Figure 20:
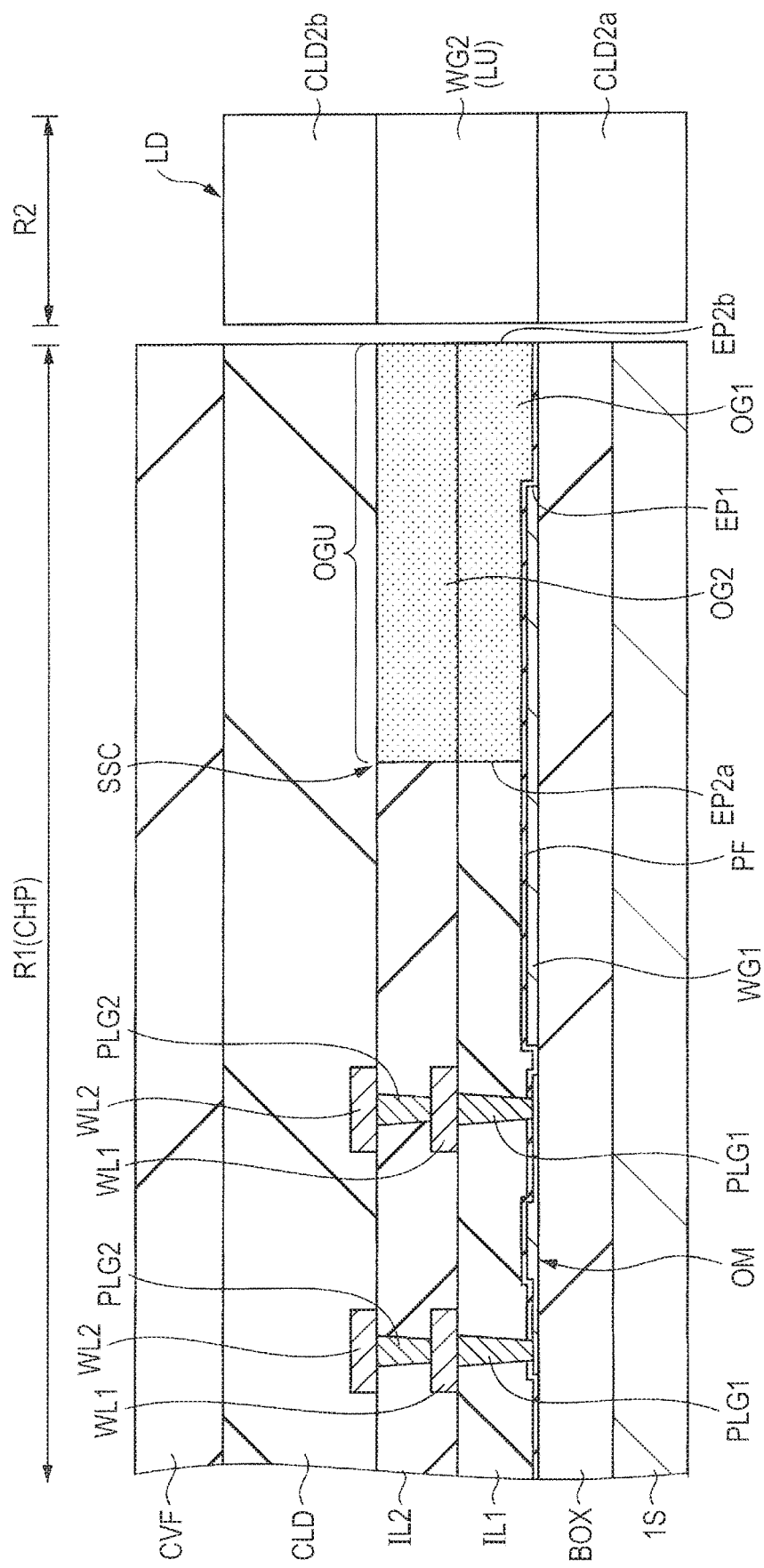
FIG. 20 is a cross sectional view of the semiconductor device along line A-A of FIG. 19.

FIG. 20 is a cross sectional view cut along line A-A of FIG. 19. As shown in FIG. 20, the optical waveguide part OGU of the spot size converter SSC has an optical waveguide body OG1 penetrating though the interlayer insulation layer IL1 and an optical waveguide body OG2 penetrating through the interlayer insulation layer IL2. At this step, as shown in FIG. 20, both of the optical waveguide body OG1 and the optical waveguide body OG2 each have a sheet shape extending in the x direction, and each have a large width in the x direction. This means that it is possible to reduce the aspect ratio of the opening formed in the interlayer insulation layer IL1 when the sheet-shaped optical waveguide part OG1 in the present Modified Example 2 is formed. In addition, this means that it is possible to reduce the aspect ratio of the opening formed in the interlayer insulation layer IL2 when the sheet-shaped optical waveguide part OG2 is formed. Therefore, in accordance with the present Modified Example 2, it is possible to improve the manufacturing ease of the optical waveguide body OG1 and the optical waveguide body OG2.

Figure 21:
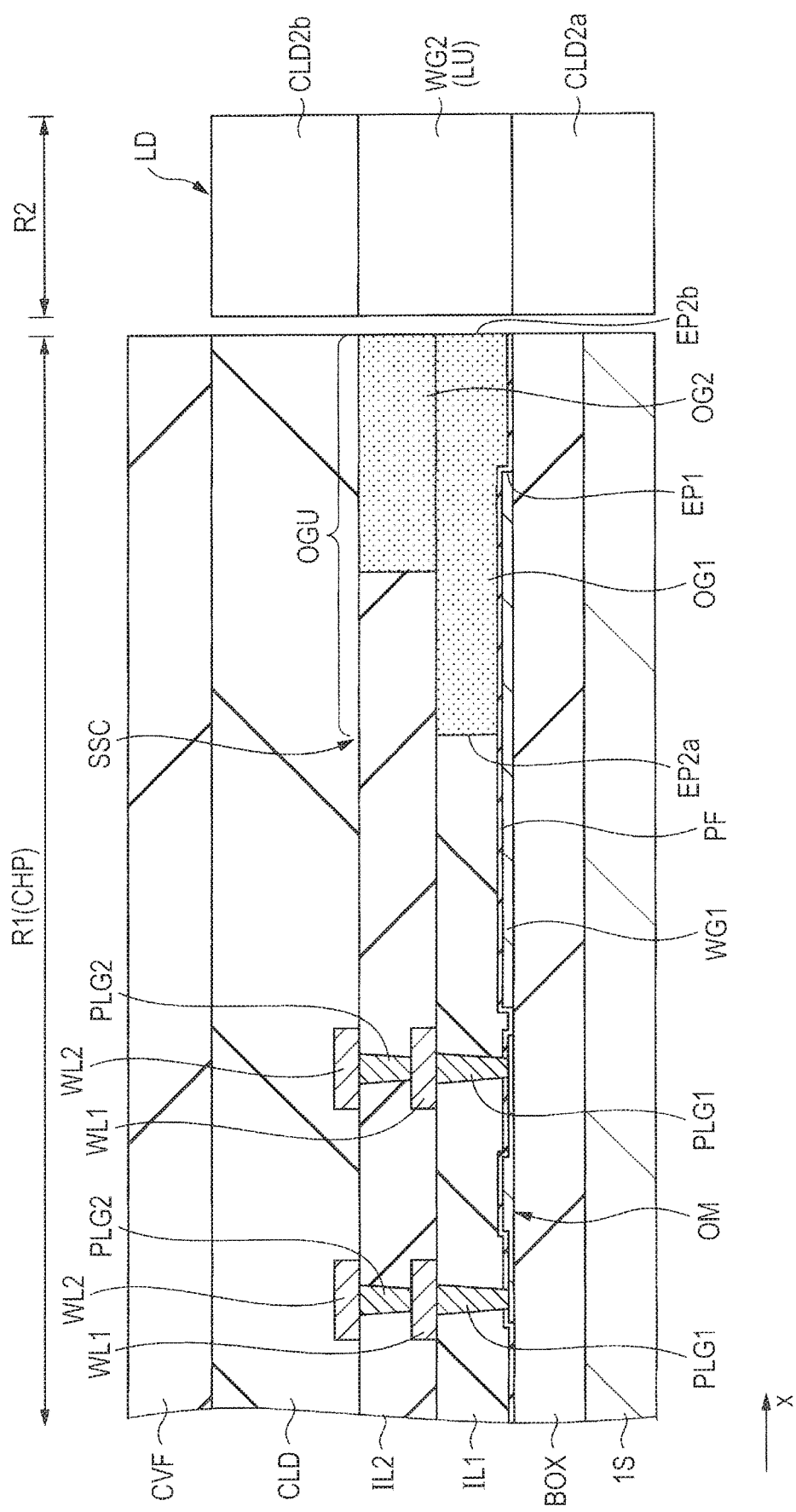
FIG. 21 is across sectional view schematically showing another aspect in Modified Example 2.

Further, FIG. 21 is a cross sectional view schematically showing another aspect in the present Modified Example 2. In FIG. 21, with the another aspect in the present Modified Example 2, the width in the x direction of the optical waveguide body OG1 situated at the lower layer (the interlayer insulation layer IL1) is larger than the width in the x direction of the optical waveguide body OG2 situated at the upper layer (the interlayer insulation layer IL2). As a result, as in the Modified Example 1, it is possible to improve the condensing efficiency of a laser light at the optical waveguide part OGU of the spot size converter SSC from the semiconductor laser LD for emitting a laser light with a large spot size toward the optical waveguide WG1 for propagating a laser light with a small spot size. That is, for the spot size converter SSC having the optical waveguide body OG1 and the optical waveguide body OG2, it is possible to improve the condensing efficiency of a laser light propagating in the x direction of FIG. 21.

MODIFIED EXAMPLE 3

Figure 22:
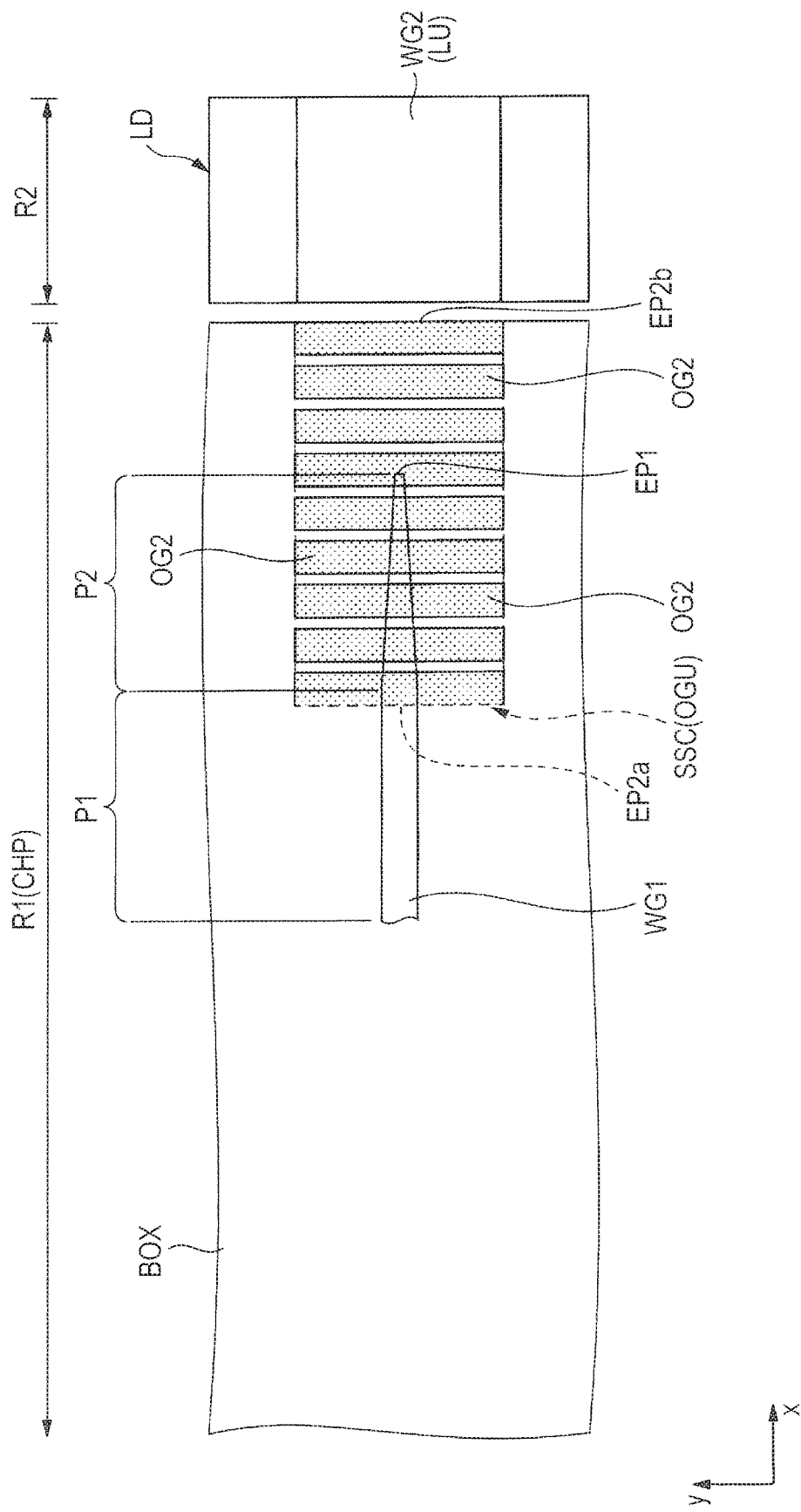
FIG. 22 is a plan view showing a schematic configuration of a semiconductor device of Modified Example 3.

Subsequently, Modified Example 3 of Second Embodiment will be described. FIG. 22 is a plan view showing a schematic configuration of a semiconductor device (semiconductor chip CHP) in the present Modified Example 3. In FIG. 22, in the region R1 of the semiconductor chip CHP, a spot size converter SSC is formed. As shown in FIG. 22, the spot size converter SSC in the present Modified Example 3 has a plurality of optical waveguide bodies OG2. At this step, each stereoscopic shape of the plurality of optical waveguide bodies OG2 is a sheet shape extending in the y direction. In addition, the interval in the x direction of the plurality of sheet-shaped optical waveguide bodies OG2 is smaller than the seeping distance of an evanescent light.

With the spot size converter SSC having the plurality of optical waveguide bodies OG2 thus configured, in the x direction, seeping of an evanescent light causes a light to propagate inside the mutually adjacent optical waveguide bodies OG2. On the other hand, each stereoscopic shape of the plurality of optical waveguide bodies OG2 is a sheet shape extending in the y direction. Accordingly, in the y direction, the optical waveguide bodies OG2 are continuously formed. As a result, with the spot size converter SSC in the present Modified Example 3, it is possible to improve the propagation efficiency in the y direction at the spot size converter SSC.

MODIFIED EXAMPLE 4

Figure 23:
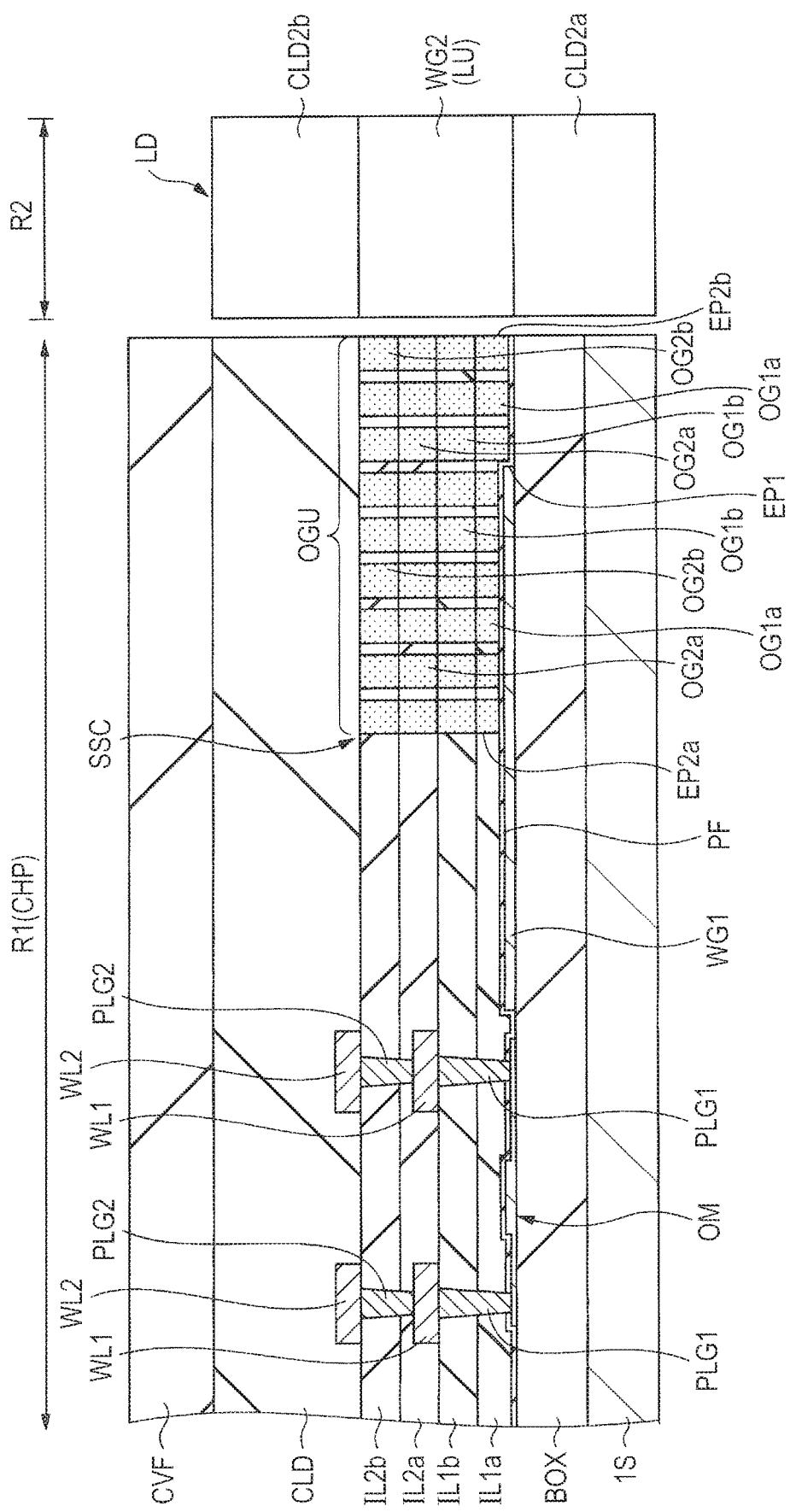
FIG. 23 is a cross sectional view showing a schematic configuration of a semiconductor device of Modified Example 4.

Then, Modified Example 4 of Second Embodiment will be described. FIG. 23 is a cross sectional view showing a schematic configuration of a semiconductor device (semiconductor chip CHP) in the present Modified Example 4. As shown in FIG. 23, the optical waveguide part OGU of the spot size converter SSC has an optical waveguide body OG1$a$ penetrating through an interlayer insulation layer IL1$a$, an optical waveguide body OG1$b$ penetrating through an interlayer insulation layer IL1$b$, an optical waveguide body OG2$a$ penetrating through an interlayer insulation layer IL2$a$, and an optical waveguide body OG2$b$ penetrating through an interlayer insulation layer IL2$b$. Thus, in the present Modified Example 4, for example, the structure equivalent to the interlayer insulation layer IL with a thickness of about 3.0 μm shown in FIG. 4 is formed of a lamination structure of the interlayer insulation layer IL1$a$, the interlayer insulation layer IL1$b$, the interlayer insulation layer IL2$a$, and the interlayer insulation layer IL2$b$ each with a small thickness. As a result, in accordance with the present Modified Example 4, it is possible to further reduce the aspect ratio of the opening for forming each of the optical waveguide body OG1$a$, the optical waveguide body OG1$b$, the optical waveguide body OG2$a$, and the optical waveguide body OG2$b$ forming the optical waveguide part OGU of the spot size converter SSC. As a result, in accordance with the present Modified Example 4, it is possible to improve the filling characteristics of the opening by a silicon nitride film. Accordingly, it is possible to improve the manufacturing ease of the optical waveguide body OG1$a$, the optical waveguide body OG1$b$, the optical waveguide body OG2$a$, and the optical waveguide body OG2$b$ forming the optical waveguide part OGU of the spot size converter SSC.

Figure 24:
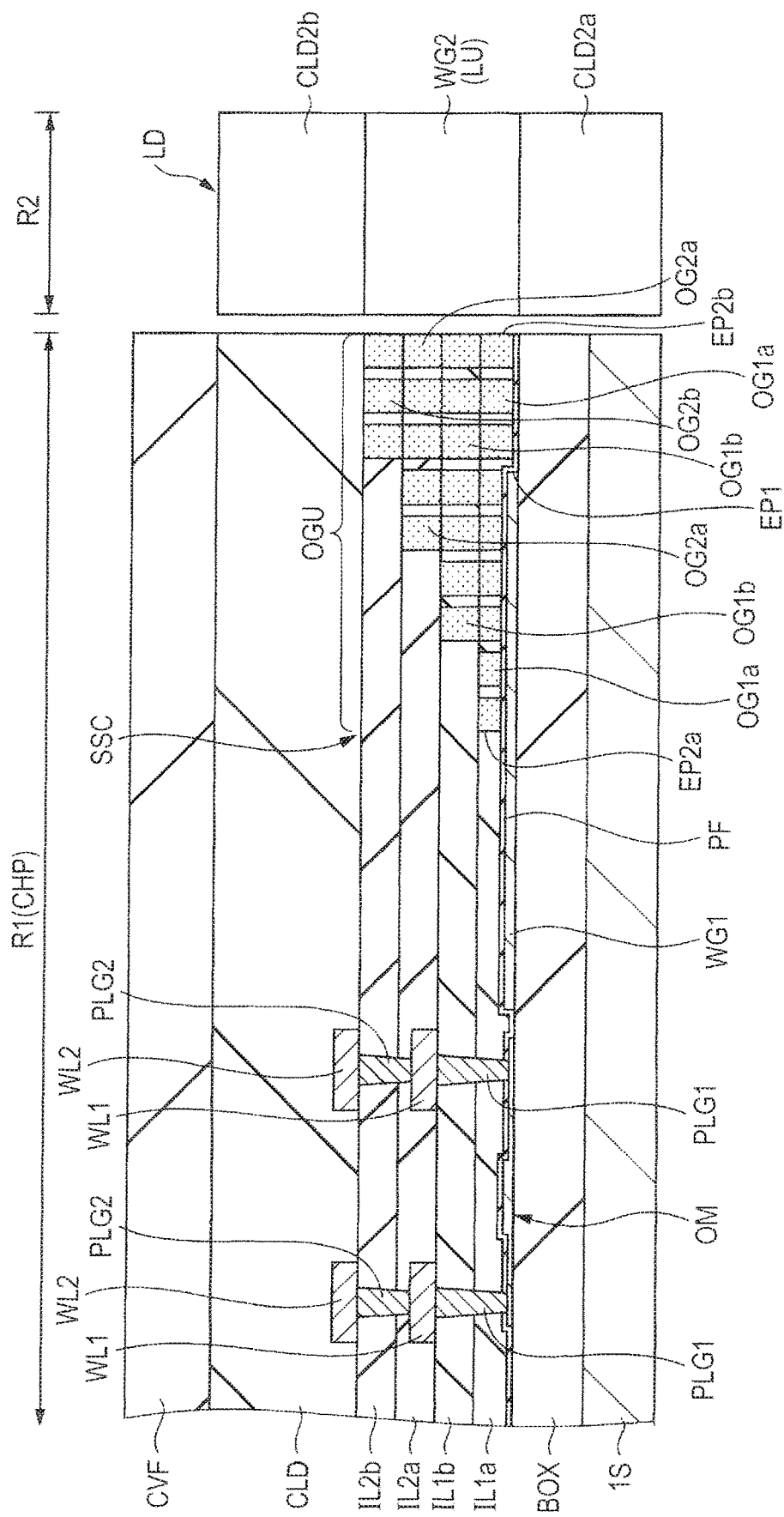
FIG. 24 is across sectional view schematically showing another aspect in Modified Example 4.

Further, FIG. 24 is a cross sectional view schematically showing a still other aspect in the present Modified Example 4. In FIG. 24, in the still other aspect in the present Modified Example 4, the number of the plurality of optical waveguide bodies OG1$a$ is larger than the number of the plurality of optical waveguide bodies OG1$b$, and the number of the plurality of optical waveguide bodies OG1$b$ is larger than the number of the plurality of optical waveguide bodies OG2$a$. In addition, the number of the plurality of optical waveguide bodies OG2$a$ is larger than the number of the plurality of optical waveguide bodies OG2$b$. Particularly, in the still other aspect in the present Modified Example 4, as shown in FIG. 24, the distance between the optical waveguide body OG1$a$ arranged at the most distant position from the other end EP2$b$ of the optical waveguide part OGU and the other end EP2$b$ of the optical waveguide part OGU is larger than the distance between the optical waveguide body OG1$b$ arranged at the most distant position from the other end EP2$b$ of the optical waveguide part OGU and the other end EP2$b$ of the optical waveguide part OGU. Then, the distance between the optical waveguide body OG1$b$ arranged at the most distant position from the other end EP2$b$ of the optical waveguide part OGU and the other end EP2$b$ of the optical waveguide part OGU is larger than the distance between the optical waveguide body OG2$a$ arranged at the most distant position from the other end EP2$b$ of the optical waveguide part OGU and the other end EPb2 of the optical waveguide part OGU. Further, the distance between the optical waveguide body OG2$a$ arranged at the most distant position from the other end EP2$b$ of the optical waveguide part OGU and the other end EP2$b$ of the optical waveguide part OGU is larger than the distance between the optical waveguide body OG2$b$ arranged at the most distant position from the other end EP2$b$ of the optical waveguide part OGU and the other end EP2$b$ of the optical waveguide part OGU. With the optical waveguide part OGU thus configured, it is possible to improve the condensing efficiency of a laser light at the optical waveguide part OGU of the spot size converter SSC from the semiconductor laser LD for emitting a laser light with a large spot size toward the optical waveguide WG1 for propagating a laser light with a small spot size. In other words, in accordance with the still other aspect of the present Modified Example 4, while improving the manufacturing ease of the optical waveguide part OGU of the spot size converter SSC, further, the performances of the spot size converter SSC can also be improved.

MODIFIED EXAMPLE 5

Figure 25:
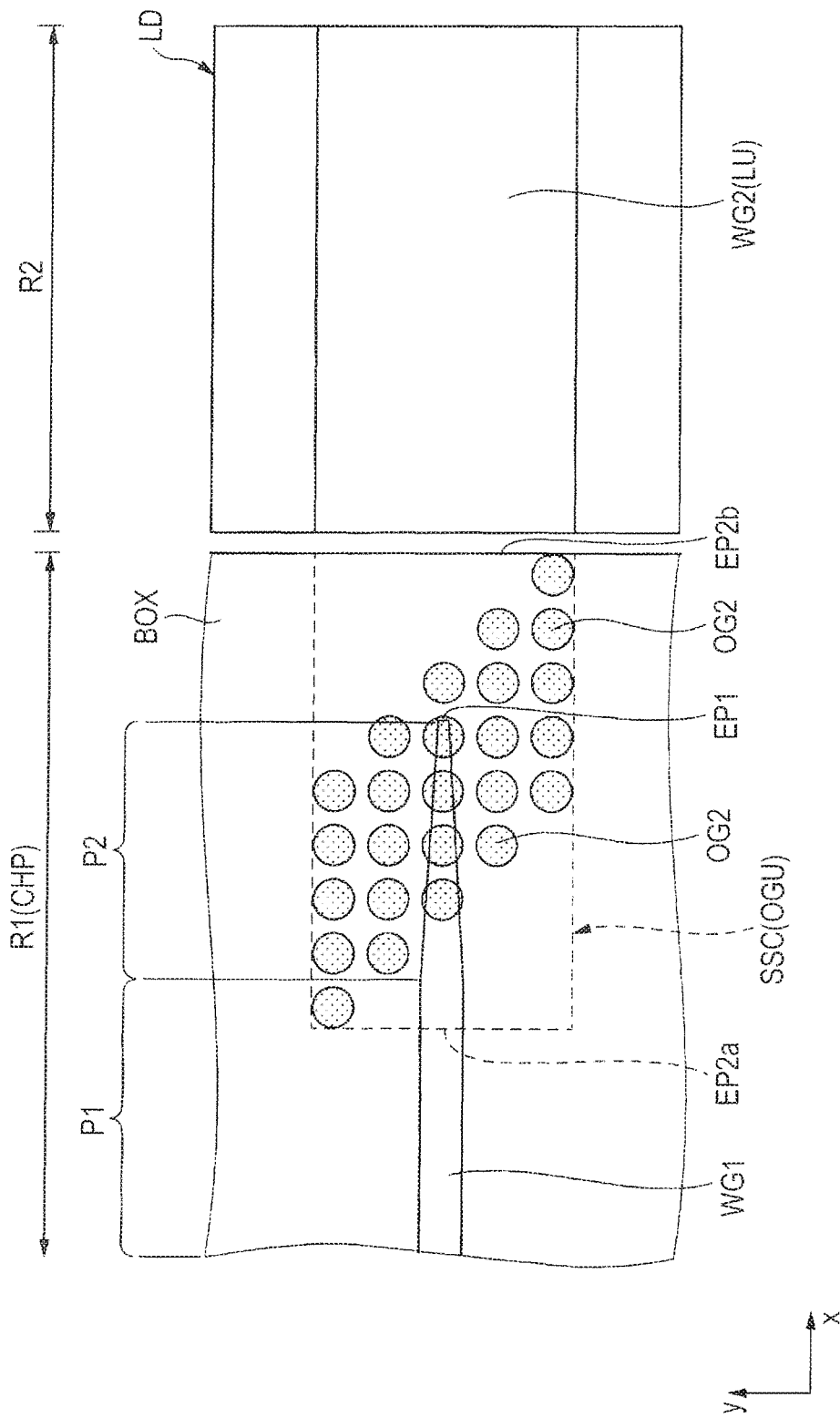
FIG. 25 is a plan view showing a schematic configuration of a semiconductor device of Modified Example 5.
Figure 26:
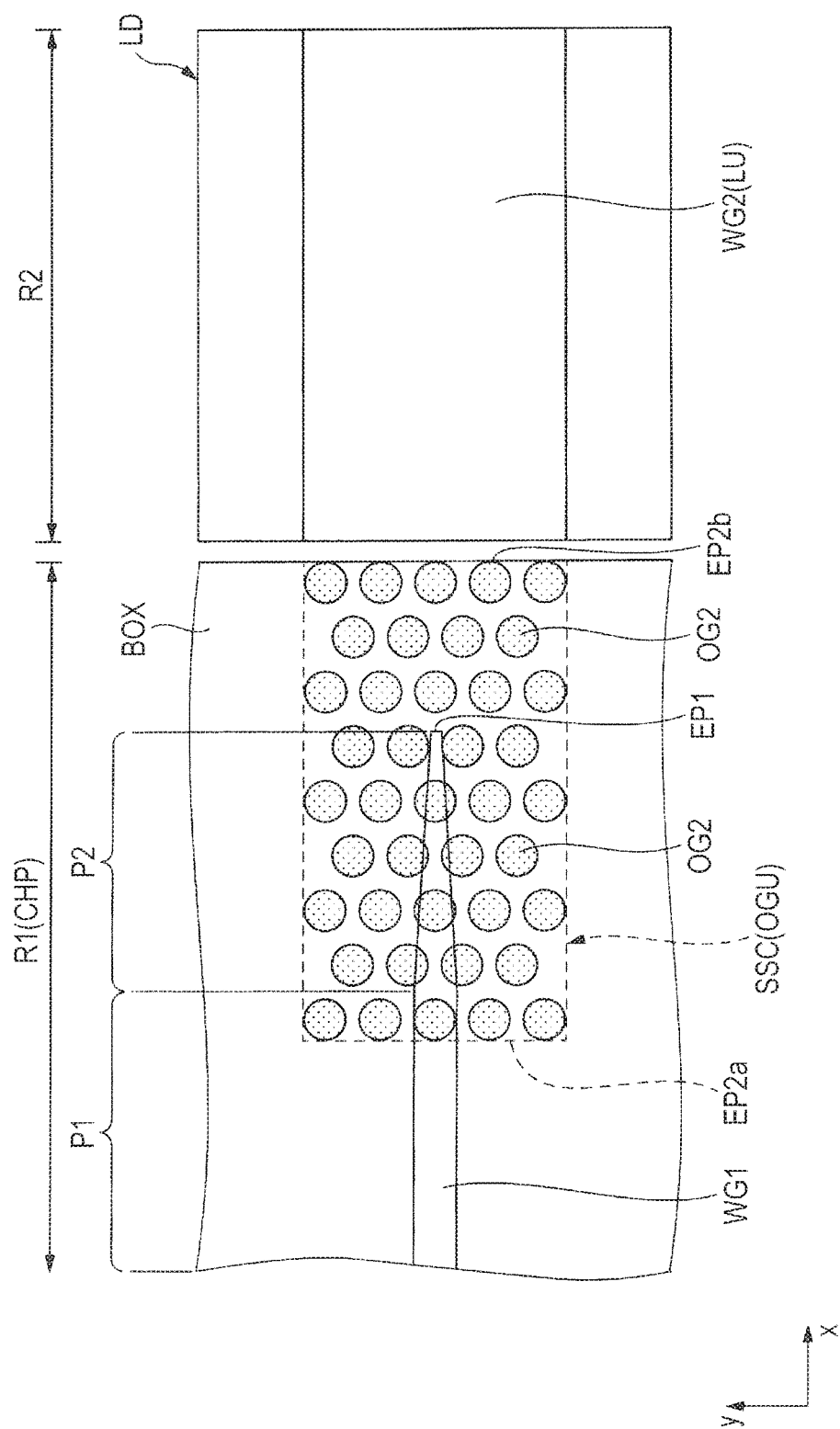
FIG. 26 is a plan view showing a schematic configuration of a semiconductor device of Modified Example 5.

Subsequently, Modified Example 5 of Second Embodiment will be described. FIG. 25 is a plan view showing a schematic configuration of a semiconductor device (semiconductor chip CHP) in the present Modified Example 5. In FIG. 25, in a region R1 of the semiconductor chip CHP, a spot size converter SSC is formed. As shown in FIG. 25, the spot size converter SSC in the present Modified Example 5 has a plurality of optical waveguide bodies OG2. At this step, for example, the plurality of optical waveguide bodies OG2 are arranged at a prescribed first pitch in the x direction of the propagation direction of a light in the optical waveguide part OGU, and are arranged at a prescribed second pitch different from the first pitch in the y direction crossing with the x direction, and along the main surface of the insulation layer BOX. Similarly, although not shown in FIG. 25, the plurality of optical waveguide bodies (OG1) are also arranged at a prescribed first pitch in the x direction, and are arranged at a prescribed second pitch different from the first pitch in the y direction. In this manner, the spot size converter SSC can be configured. That is, for the arrangement layout of the plurality of optical waveguide bodies OG2 and the plurality of optical waveguide bodies (OG1) forming the optical waveguide part (OGU) of the spot size converter SSC, the layout can be configured freely so long as the condition under which the interval is smaller than the seeping distance of an evanescent light is satisfied. Therefore, for example, the plurality of optical waveguide bodies OG2 and the plurality of optical waveguide bodies (OG1) forming the optical waveguide part (OGU) of the spot size converter SSC can also be arranged as shown in FIG. 26.

Up to this point, the invention completed by the present inventors was specifically described by way of embodiments thereof. However, it is naturally understood that the present invention is not limited to the embodiments, and may be variously changed within the scope not departing from the gist thereof.

For example, in the embodiment, a description has been given to the example, in which the plurality of optical waveguide bodies (OG, OG1, and OG2) forming the optical waveguide part (OGU) of the spot size converter are formed of silicon nitride. However, the technical idea in the embodiment is not limited thereto. The plurality of optical waveguide bodies (OG, OG1, and OG2) can be formed of a material having a larger refractive index than that of silicon oxide, and can also be formed of, for example, silicon oxynitride or silicon.

For example, a consideration will be given to the case where the plurality of optical waveguide bodies (OG, OG1, OG2) are formed of silicon. In this case, by slightly leaving the semiconductor layer of the SOI substrate, it is possible to form all of the plurality of optical waveguide bodies (OG, OG1, and OG2) from silicon by epitaxial growth of silicon in the opening in contact with the optical waveguide (WG1), and epitaxial growth of silicon in the opening in contact with the semiconductor layer slightly left over the insulation layer (BOX). At this step, use of the epitaxial growth method can form the plurality of optical waveguide bodies (OG, OG1, and OG2) without damaging the optical waveguide (WG1).

Further, in the embodiment, for example, a description has been given to the example in which the protective film PF is formed as shown in FIG. 4. However, the technical idea in the embodiment is not limited thereto, and the protective film PF is not required to be provided.

What is claimed is:

1. A semiconductor device, comprising:
   an insulation layer;
   an optical waveguide formed over the insulation layer;
   a first interlayer insulation layer formed over the insulation layer in such a manner as to cover the optical waveguide;
   a second interlayer insulation layer formed over the first interlayer insulation layer; and
   an optical waveguide part having a plurality of first optical waveguide bodies penetrating through the first interlayer insulation layer in a thickness direction and separated from one another, and a plurality of second optical waveguide bodies penetrating through the second interlayer insulation layer in the thickness direction and separated from one another, the optical waveguide part having one end arranged in such a manner as to cover one end of the optical waveguide, and the other end including a light receiving surface for receiving an external light and capable of propagating the light therethrough,
   wherein one of the plurality of first optical waveguide bodies overlaps with the optical waveguide in a plan view, and
   wherein another one of the plurality of first optical waveguide bodies is adjacent to the one of the plurality of first optical waveguide bodies, in a direction orthogonal to an extending direction of the optical waveguide and along a main surface of the insulating layer, without overlapping with the optical waveguide in the plan view.

2. The semiconductor device according to claim 1,
   wherein an interval between mutually adjacent two first optical waveguide bodies of the first optical waveguide bodies is smaller than a seeping distance from the first optical waveguide body toward the first interlayer insulation layer of the light propagating through the optical waveguide part, and
   wherein an interval between mutually adjacent two second optical waveguide bodies of the second optical waveguide bodies is smaller than a seeping distance from the second optical waveguide body toward the second interlayer insulation layer of the light propagating through the optical waveguide part.

3. The semiconductor device according to claim 1, wherein a tip of one end of the optical waveguide is situated between one end of the optical waveguide part and the other end of the optical waveguide part.

4. The semiconductor device according to claim 1,
   wherein each stereoscopic shape of the first optical waveguide bodies is a columnar shape, and
   wherein each stereoscopic shape of the second optical waveguide bodies is a columnar shape.

5. The semiconductor device according to claim 4,
   wherein the first optical waveguide bodies are arranged at a first pitch in a first direction of the propagation direction of the light in the optical waveguide part, and, are also arranged at the first pitch in a height direction of the first optical waveguide body and a second direction orthogonal to the first direction, and
   wherein the second optical waveguide bodies are arranged at the first pitch in the first direction, and, are also arranged at the first pitch in the second direction.

6. The semiconductor device according to claim 4,
   wherein the first optical waveguide bodies are arranged at a first pitch in a first direction of the propagation direction in the optical waveguide part, and are arranged at a second pitch different from the first pitch in a height direction of the first optical waveguide body and a second direction orthogonal to the first direction, and
   wherein the second optical waveguide bodies are also arranged at the first pitch in the first direction, and are arranged at the second pitch different from the first pitch in the second direction.

7. The semiconductor device according to claim 1,
   wherein each stereoscopic shape of the first optical waveguide bodies is a sheet shape, and
   wherein each stereoscopic shape of the second optical waveguide bodies is a sheet shape.

8. The semiconductor device according to claim 7,
   wherein the first optical waveguide bodies are arranged side by side along a first direction of the propagation direction of the light in the optical waveguide part, and
   wherein the second optical waveguide bodies are also arranged side by side along the first direction.

9. The semiconductor device according to claim 7,
   wherein the first optical waveguide bodies are arranged side by side in a first direction of the propagation direction of the light in the optical waveguide part, and a second direction orthogonal to a height direction of the first optical waveguide body, and
   wherein the second optical waveguide bodies are also arranged side by side along the second direction.

10. The semiconductor device according to claim 1, wherein a distance between the first optical waveguide body arrange at the most distant position from the other end of the optical waveguide part of the first optical waveguide bodies and the other end of the optical waveguide part is larger than the distance between the second optical waveguide body arranged at the most distant position from the other end of the optical waveguide part of the second optical waveguide bodies and the other end of the optical waveguide part.

11. The semiconductor device according to claim 1,
    wherein the semiconductor device has a third interlayer insulation layer formed over the second interlayer insulation layer, and
    wherein the optical waveguide part further includes a plurality of third optical waveguide bodies penetrating through the third interlayer insulation layer in the thickness direction.

12. The semiconductor device according to claim 1, further including:

an optical modulator formed over the insulation layer in such a manner as to be covered with the first interlayer insulation layer;

a plug penetrating through the first interlayer insulation layer, and coupled with the optical modulator; and a first wire formed over the first interlayer insulation layer in such a manner as to be covered with the second interlayer insulation layer, and coupled with the plug.

13. The semiconductor device according to claim 1, wherein the light is a light emitted from a laser light source.

14. A method for manufacturing a semiconductor device, comprising the steps of:
   (a) providing a semiconductor wafer having a plurality of element formation regions formed of an insulation layer and a semiconductor layer formed over the insulation layer, and adjacent to one another;
   (b) patterning the semiconductor layer, and thereby forming an optical waveguide in each of the element formation regions;
   (c) forming a first interlayer insulation layer over the insulation layer in such a manner as to cover the optical waveguide;
   (d) forming a plurality of first through parts penetrating through the first interlayer insulation layer in a thickness direction, and separated from one another in the first interlayer insulation layer in each of the element formation regions; and
   (e) burying a film having a higher refractive index than the refractive index of the first interlayer insulation layer in each inside of the first through parts, and forming a first optical waveguide part capable of propagating a light through the inside thereof,
   wherein one end of the first optical waveguide part is arranged in such a manner as to cover one end of the optical waveguide,
   wherein the other end of the first optical waveguide part includes a light receiving surface for receiving the light from the outside,
   wherein one of the plurality of first through parts overlaps with the optical waveguide in a plan view, and
   wherein another one of the plurality of first through parts is adjacent to the one of the plurality of first through parts, in a direction orthogonal to an extending direction of the optical waveguide and along a main surface of the insulation layer, without overlapping with the optical waveguide in the plan view.

15. The method for manufacturing a semiconductor device according to claim 14, further comprising, after the step (e), the steps of:
   (f) forming a second interlayer insulation layer over the first interlayer insulation layer;
   (g) forming a plurality of second through parts penetrating through the second interlayer insulation layer in the thickness direction, and separated from one another in the second interlayer insulation layer in each of the element formation regions; and
   (h) burying a film having a higher refractive index than the refractive index of the second interlayer insulation layer in each inside of the second through parts, and forming a second optical waveguide part capable of propagating the light through the inside thereof,
   wherein one end of the second optical waveguide part is arranged in such a manner as to cover one end of the optical waveguide, and
   wherein the other end of the second optical waveguide part includes a light receiving surface for receiving the light from the outside.

16. A semiconductor device, comprising:

an insulation layer;

an optical waveguide formed over the insulation layer;

an interlayer insulation layer formed over the insulation layer in such a manner as to cover the optical waveguide; and an optical waveguide part having a plurality of optical waveguide bodies penetrating through the interlayer insulation layer in a thickness direction and separated from one another, the optical waveguide part being arranged such that one end thereof covers one end of the optical waveguide, and including a light receiving surface for receiving an external light at the other end thereof, and capable of propagating the light therethrough, wherein the optical waveguide bodies include:
   a first optical waveguide body overlapping the optical waveguide in a plan view; and
   a second optical waveguide body separated from the optical waveguide in the plan view, and
   wherein the second waveguide body is adjacent to the first optical waveguide body, in a direction orthogonal to an extending direction of the optical waveguide and along a main surface of the insulation layer, without overlapping with the optical waveguide in the plan view.

17. The semiconductor device according to claim 16, wherein the plan-view shape of a tip of the optical waveguide is a taper shape narrowing in depth with approach toward the tip.

18. The semiconductor device according to claim 17, wherein the optical waveguide is formed of a semiconductor layer including silicon.

19. The semiconductor device according to claim 1, wherein the light receiving surface is located at a side surface of optical waveguide part.

* * * * *